(12) United States Patent
Greenwald et al.

(10) Patent No.: US 10,766,799 B2
(45) Date of Patent: Sep. 8, 2020

(54) METHOD FOR IMPROVING QUALITY OF AQUACULTURE POND WATER USING A NUTRIENT GERMINANT COMPOSITION AND SPORE INCUBATION METHOD

(71) Applicant: NCH Corporation, Irving, TX (US)

(72) Inventors: Charles Greenwald, Dallas, TX (US); Gabriel F. K. Everett, Mansfield, TX (US); Judy Pruitt, Mesquite, TX (US); Amanda Rosmarin, Lewisville, TX (US); Jordan Church, Lewisville, TX (US); Daniel Aberle, Irving, TX (US); George Aboagye, Derby (GB); Skylar Rae White, Weatherford, TX (US); Haibo Cao, Flower Mound, TX (US); Christopher Zetena, Dallas, TX (US); Kelly Gillespie, Richardson, TX (US)

(73) Assignee: NCH Corporation, Irving, TX (US)

(*) Notice: Subject to any disclaimer, the term of this patent is extended or adjusted under 35 U.S.C. 154(b) by 224 days.

(21) Appl. No.: 15/907,682

(22) Filed: Feb. 28, 2018

(65) Prior Publication Data
US 2019/0071336 A1    Mar. 7, 2019

Related U.S. Application Data

(63) Continuation-in-part of application No. 14/720,088, filed on May 22, 2015, now Pat. No. 9,908,799, and
(Continued)

(51) Int. Cl.
*C02F 3/34* (2006.01)
*A01K 61/13* (2017.01)
(Continued)

(52) U.S. Cl.
CPC ............ *C02F 3/348* (2013.01); *A01K 61/13* (2017.01); *A01K 63/04* (2013.01); *C02F 3/302* (2013.01);
(Continued)

(58) Field of Classification Search
CPC combination set(s) only.
See application file for complete search history.

(56) References Cited

U.S. PATENT DOCUMENTS

| 4,314,995 A | 2/1982 | Hata et al. |
| 4,840,792 A | 6/1989 | Joulain et al. |

(Continued)

FOREIGN PATENT DOCUMENTS

| CN | 1528681 | 9/2004 |
| CN | 105060980 | 11/2015 |

(Continued)

OTHER PUBLICATIONS

Waites et al. "The Effect of pH, Germinants and Temperature on the Germination of Spores of Clostridium bifermentans". Journal of General Microbiology, 1974, 80, 253-258 (Year: 1974).*

(Continued)

*Primary Examiner* — Ryan B Huang
(74) *Attorney, Agent, or Firm* — Ross Barnes LLP; Robin L. Barnes

(57) ABSTRACT

A method for improving the quality of pond water used in aquaculture applications by adding to the pond water active bacteria that are preferably germinated from spores on site using a nutrient-germinant composition and an incubation method for increased spore germination efficiency, in combination with a nitrification enhancement agent such as calcium carbonate or calcified seaweed, and an optional reaction surface area modifier such as calcified seaweed or plastic or metal particles or fragments. The nutrient-germi-
(Continued)

nant composition comprises L-amino acids, D-glucose and/ or D-fructose, a phosphate buffer, an industrial preservative, and may include bacteria spores (preferably of one or more *Bacillus* species) or they may be separately combined for germination. The incubation method comprises heating a nutrient germinant composition and bacteria spores, to a temperature range of 35° C. to 60° C. for around 2 to 60 minutes to produce an incubated bacteria solution that is discharged to the aquaculture application.

46 Claims, 9 Drawing Sheets

Related U.S. Application Data a continuation-in-part of application No. 15/479,773, filed on Apr. 5, 2017, now Pat. No. 10,610,552.

(60) Provisional application No. 62/002,476, filed on May 23, 2014, provisional application No. 62/318,587, filed on Apr. 5, 2016.

(51) Int. Cl.
| | | |
|---|---|---|
| *A01K 63/04* | (2006.01) | |
| *C02F 103/20* | (2006.01) | |
| *C02F 101/16* | (2006.01) | |
| *C02F 101/30* | (2006.01) | |
| *C02F 101/10* | (2006.01) | |
| *C02F 3/30* | (2006.01) | |

(52) U.S. Cl.
CPC .... *C02F 2101/105* (2013.01); *C02F 2101/16* (2013.01); *C02F 2101/30* (2013.01); *C02F 2103/20* (2013.01)

(56) References Cited

U.S. PATENT DOCUMENTS

| | | |
|---|---|---|
| 4,872,985 A | 10/1989 | Dinges |
| 4,910,024 A | 3/1990 | Pratt |
| 4,919,936 A | 4/1990 | Iwanami et al. |
| 4,995,980 A | 2/1991 | Jauhert |
| 4,999,193 A | 3/1991 | Nguyen |
| 5,093,121 A | 3/1992 | Kvanta et al. |
| 5,154,594 A | 10/1992 | Gamlen |
| 5,292,523 A | 3/1994 | Kono et al. |
| 5,320,256 A | 6/1994 | Wood |
| 5,501,857 A | 3/1996 | Zimmer |
| 5,702,604 A | 12/1997 | Yamasaki et al. |
| 5,821,112 A | 10/1998 | Botta et al. |
| 5,968,569 A | 10/1999 | Cavadini et al. |
| 6,254,910 B1 | 7/2001 | Paluch |
| 6,308,658 B1 | 10/2001 | Steckel |
| 6,312,746 B2 | 11/2001 | Paluch |
| 6,327,965 B1 | 12/2001 | Tien |
| 6,335,191 B1 | 1/2002 | Kiplinger et al. |
| 6,382,132 B1 | 5/2002 | Steckel et al. |
| 6,461,607 B1 | 10/2002 | Farmer |
| 6,498,137 B1 | 12/2002 | Schalitz et al. |
| 6,723,076 B1 | 4/2004 | Strobel |
| 6,827,957 B2 | 12/2004 | Paluch et al. |
| 6,849,256 B1 | 2/2005 | Farmer |
| 7,081,361 B2 | 7/2006 | Pearce, III et al. |
| 7,485,466 B2 | 2/2009 | Jenkins et al. |
| 7,635,587 B2 | 12/2009 | Pearce, III et al. |
| 7,670,845 B2 | 3/2010 | Wenzel et al. |
| 7,713,726 B2 | 5/2010 | Farmer |
| 7,754,469 B2 | 7/2010 | Baltzley et al. |
| 8,025,847 B2 | 9/2011 | Fouarge et al. |
| 8,025,874 B2 | 9/2011 | Ballot et al. |
| 8,062,902 B2 | 11/2011 | Mestrallet |
| 8,093,040 B2 | 1/2012 | Pearce, III et al. |
| 8,192,733 B2 | 6/2012 | Cobb et al. |
| 8,277,799 B2 | 10/2012 | Farmer |
| 8,349,337 B1 | 1/2013 | Farmer et al. |
| 8,404,227 B2 | 3/2013 | Bellot et al. |
| 8,506,951 B2 | 8/2013 | Rehberger et al. |
| 8,540,981 B1 | 9/2013 | Wehnes et al. |
| 8,551,762 B2 | 10/2013 | Fleming et al. |
| 8,647,690 B2 | 2/2014 | Corrigan |
| 9,011,834 B1 | 4/2015 | Mckenzie et al. |
| 9,447,376 B2 | 9/2016 | Hashman et al. |
| 9,932,543 B2 | 4/2018 | Hashman et al. |
| 2003/0031659 A1 | 2/2003 | Farmer |
| 2003/0165472 A1 | 9/2003 | McGrath et al. |
| 2006/0093591 A1 | 5/2006 | Farmer et al. |
| 2006/0275324 A1 | 12/2006 | Elston et al. |
| 2008/0107699 A1 | 5/2008 | Spigelman et al. |
| 2008/0241226 A1 | 10/2008 | Abeln et al. |
| 2009/0041898 A1 | 2/2009 | Garbolino et al. |
| 2009/0111694 A1 | 4/2009 | Dituro |
| 2009/0186057 A1 | 7/2009 | Farmer et al. |
| 2009/0232941 A1 | 9/2009 | Farmer |
| 2011/0020914 A1* | 1/2011 | Abou-Nemeh .......... C12N 1/12 435/257.4 |
| 2011/0189132 A1 | 8/2011 | Garner et al. |
| 2011/0230245 A1 | 9/2011 | Snyder et al. |
| 2011/0256216 A1 | 10/2011 | Lefkowitz |
| 2012/0052152 A1 | 3/2012 | Armentrout |
| 2012/0100094 A1 | 4/2012 | Reuter et al. |
| 2013/0017174 A1 | 1/2013 | Hargis et al. |
| 2013/0092087 A1 | 4/2013 | Bachman et al. |
| 2013/0202562 A1 | 8/2013 | Wood |
| 2014/0220662 A1 | 8/2014 | Hashman |
| 2014/0295483 A1 | 10/2014 | Lyte |
| 2015/0118203 A1 | 4/2015 | Boyette et al. |
| 2016/0362654 A1 | 12/2016 | Hashman et al. |
| 2017/0281696 A1 | 10/2017 | Everett et al. |

FOREIGN PATENT DOCUMENTS

| | | | |
|---|---|---|---|
| EP | 0410877 | 1/1991 | |
| EP | 0826311 | 3/1998 | |
| EP | 0885557 | 8/2004 | |
| WO | WO-9905310 A1 * | 2/1999 | |
| WO | WO2000033854 | 6/2000 | |
| WO | WO2002051264 | 7/2002 | |
| WO | WO2006002495 | 1/2006 | |
| WO | WO2008071930 | 6/2008 | |
| WO | WO2009040445 | 4/2009 | |
| WO | WO2009117790 | 10/2009 | |
| WO | WO2009126473 | 10/2009 | |
| WO | WO2010003255 | 1/2010 | |
| WO | WO-2010003255 A1 * | 1/2010 | .......... C05F 17/0018 |
| WO | WO2010020639 | 2/2010 | |
| WO | WO2010045541 | 4/2010 | |
| WO | WO2010066012 | 6/2010 | |
| WO | WO2010079104 | 7/2010 | |
| WO | WO2010088744 | 8/2010 | |
| WO | WO2010142004 | 12/2010 | |
| WO | WO-2010142004 A2 * | 12/2010 | ............ C12M 21/04 |
| WO | WO2012027214 | 3/2012 | |
| WO | WO2012108830 | 8/2012 | |
| WO | WO2012167882 | 12/2012 | |
| WO | WO2013191642 | 12/2013 | |
| WO | WO2014083177 | 6/2014 | |
| WO | WO2014193746 | 12/2014 | |
| WO | WO-2014193746 A1 * | 12/2014 | ............ A01N 63/00 |
| WO | WO2016022779 | 2/2016 | |

OTHER PUBLICATIONS

Use of probiotics in aquaculture, EPA Position Paper, 2012.
Chorawala, M. R., P. M. Oza, G. B. Shah. Probiotics, Prebiotics and Synbiotics: A Health Benefit Supplement. Published Jul.-Sep. 2011 by the Research Journal of Pharmaceutical, Biological and Chemical Sciences vol. 2, Issue 3, pp. 1101-1111.
Sekhon, B. S. and J. Saloni. Prebiotics, probiotics and synbiotics: an overview. Published Dec. 2010 by the Journal of Pharmaceutical Education and Research. vol. 1, Issue No. 2, pp. 13-36.

(56) References Cited

OTHER PUBLICATIONS

Patterson, J.A., K. M. Burkholder. Application of prebiotics and probiotics in poultry production. Published in Jan. 2003 by Poultry Science 82:627-631.

ADM Animal Nutrition—Direct Fed Microbial Application and Usage, product information available from AMD Animal Nutrition, a division of Archer Daniels Midland Company, believed to be published prior to 2014; obtained from the Internet on Dec. 28, 2016 at <http://www.admani.com/Animal%20Health/Tech%20Bulletins/Animal%20Direct%20fed%20microbial.htm>.

Casula, G and S. Cutting. Bacillus Probiotics: Spore Germination in the Gastrointestinal Tract. Published May 2002 by the American Society for Microbiology in Applied and Environmental Microbiology vol. 68, No. 5: 2344-2352.

Amerah, A.M., C. J. van Rensburg, P. W. Plumstead, C. Kromm, and S. Dunham. Effect of feeding diets containing a probiotic or antibiotic on broiler performance, intestinal mucosa-associated avian pathogenic *E. coli* and litter water-soluble phosphorus. Published in Jan. 2013 in the Journal of Applied Animal Nutrition, vol. 1, e7, pp. 1-7.

Sutton, A.L. et al., Potential for Reduction of Odorous Compounds in Swine Manure Through Diet Modification, Published in 1999 by the American Society of Animal Science in the Journal Anim. Sci. 1999, 77:430-439.

Davis M.E. et al. Effect of a Bacillus-based direct-fed microbial feed supplement on growth performance and pen cleaning characteristics of growing-finishing pigs, Published in 2008 y the American Society of Animal Sciences in the Journal of Anim. Sci. 2008, 86:1459-1467.

BioGrow & Provita Gameguard, product information available from Provita Eurotech Limited, 21 Bankmore Road, Omagh, County Tyrone, Northern Ireland, believed to be published at least as early as 2013 (BioGrow product available since 2001).

BioGrow, product information available from Provita Eurotech Limited, believed to be published at least as early as 2013 (BioGrow product available since 2001), retrieved from the Internet on Feb. 16, 2015 at <http://www.provita.co.uk/poultry/biogrow>.

Swine Bluelite 2Bw a water soluble acidified electrolyte product with probiotics for pigs, product information available from TechMix Global, published Sep. 2011, retrieved from the Internet on Feb. 15, 2016 at <https://www.techmlxglobal.com/swine-bluelite-2bw>.

Calsporin Poultry FAQ, product information available from Quality Technology International, Inc., published 2012, retrieved from the Internet on Feb. 15, 2016 at <http://www.qtitechnology.com/sites/default/files/pdfs/CalsporinPoultryFAQ.pdf>.

Calsporin Swine FAQ, product information available from Quality Technology International, Inc., published 2012, retrieved from the internet on Feb. 15, 2016 at <http://www.qtitechnology.com/sites/default/files/pdfs/CalsporinSwineFAQ.pdf>.

Calsporin, product information available from Calpis Co., Ltd. 4-1 Ebisu-Minami 2-chome Shibuya, Tokyo, Japan, believed to be published at least as early as 2013 (product available since at least 2000).

European Food Safety Authority Scientific Opinion on the Safety and Efficacy of BioPlus2B, published in the EFSA Journal 2011; 9(9):2356, retrieved from the Internet on Feb. 15, 2016 at <http://www.efsa.europa.eu/sites/default/files/scientific_output/files/main_documents/2356.pdf>.

FloraMax B-11 Proven in the Lab . . . confirmed in the field, product information available from Pacific Vet Group, elieved to be published at least as early as 2011 (product available in 2004), Retrieved from the Internet on Feb. 16, 2015 at <http://www.pacificvetgroup.com/docs/PVG-FloraMaxB-11.pdf >.

Floramax B11 (Tech Sheet) product information available from Ivesco, believed to be published at least as early as 2011 (product available since 2004), Retrieved from the Internet on Feb. 16, 2015 at <http://www.ivescopoultry.com/Attachment/5/20535_5_FloraMaxTechSheet.pdf>.

Scientific opinion on the safety and efficacy of Bactocell (*Pediococcus acidilactici*) as a feed additive for use in water for drinking for weaned piglets, pigs for fattening, laying hens and chickens for fattening, published by the European Food Safety Authority in 2012 in the EFSA Journal 2012: 10(7):2776.

Fortify Liquid Concentrated Direct-Fed Microbial for Drinking Water product label information published by Assist Natural Product, Lena, Illinois, product believed to be available since 2013, retrieved from the internet on Feb. 16, 2015 at <http://www.assist-nps.com/files/Fortify%20Liquid%20Label.pdf>.

BACTOCELL® Drink is now authorized in Europe as a feed additive for swine and poultry, news release published by Lallemand Animal Nutrition on May 15, 2013, retrieved from the Internet on Feb. 16, 2015 at <http://lallemandanimalnutrition.com/news/bactocell-drink-is-now-authorized-in-europe-as-a-feed-additive-for-swine-and-poultry/>.

BACTOCELL on tracks for EU Authorization as Additive for Drinking Water, news release published by Lallemand Animal Nutrition on Aug. 29, 2012, retrieved from the Internet on Feb. 16, 2015 at <http://lallemandanimalnutrition.com/news/bactocell-drink-on-tracks-for-eu-authorization-as-a-feed-additive-for-use-in-drinking-water-for-swine-and-poultry/>.

Biotic for Shrimp—product Information available from Biopharmachemie, believed to be published at least as early as 2011, Retrieved from the Internet on Feb. 16, 2015 at <http://biopharmachemie.com/product/products-for-shrimp/biotic-for-shrimp.html>.

Biozyme for Shrimp—product information available from Biopharmachemie, believed to be published at least as early as 2011, Retrieved from the Internet on Feb. 16, 2015 at <http://biopharmachemie.com/product/products-for-shrimp/biozyme-for-shrimp.html>.

Delivering superior swine performance—product information on VevoVitall available from DSM, believed to be published at least as early as 2011, ; retrieved from the Internet on Feb. 15, 2016 at <http://www.dsm.com/markets/anh/en_US/products/products-eubiotics/products-eubiotics-vevovitall.html>.

Poultry Product Quality—product information regarding BioPlus available from Chr. Hansen, believed to be published at least as early as 2011, retrieved from the Internet on Feb. 15, 2016 at <http://www.chr-hansen.com/animal-probiotics-and-silage-inoculants/probiotics-for-poultry/poultry-product-quality>.

Biotic for Poultry and Swine—product information available from Biopharmachemie, believed to be published at least as early as 2011, Retrieved from the Internet on Feb. 16, 2015 at <http://www.biopharmachemie.com/product/products-for-livestock/biotic.html>.

Proflora, Live DFM: Bacillus subtilis Strain QST 713,product information available from Zoetis, 100 Campus Drive, Florham Park, New Jersey 07932, believed to be published at least as early as 2013.

Proflora Live DFM: Bacillus subtilis Strain QST 713,product Information available from Zoetis, believed to be published at least as early as 2013, Retrieved from the Internet on Feb. 16, 2015 at <https://www.zoetisus.com/products/poultry/proflora.aspx>.

Timmermann et al., Metabolism and Nutrition Mortality and Growth Performance of Broilers Given Drinking Water Supplemented with Chicken-Specific Probiotics, Poultry Science, vol. 85, Aug. 1, 2006. pp. 1383-1388.

Katsutosh et al., Effect of spore-bearing lactic acid-forming bacteria (*Bacillus coagulans* SANK 70258) administration on the intestinal environment, defecation frequency, fecal characteristics and dermal characteristics in humans and rats, Microbial Ecology in Health & Dis, Co-Action Publishing, SE, vol. 14, No. 1, Mar. 2002, pp. 4-13.

El-Mougy (Application of Fungicides Alternatives as Seed Treatment for Controlling Root Rot of Some Vegetables in Pot Experiments. Advances in Life Sciences 2012, 2(3):57-64).

Yeo et al (Antihypertensive Properties of Plant-Based Prebiotics. Int. J. Mol. Sci. 2009, 10, 3517-3530).

He et al. Effects of Trehalose, Glycerin and NaCl on the Growth and Freeze-Drying of Lactobacillus Acidophilus. Information Technology and Agricultural Engineering. 2012; 967-971).

Safe Feeding with Lupro-Grain and Amasil NA—product brochure. available from BASF Chemical Company, published at least as

(56) References Cited

OTHER PUBLICATIONS early as 2011, Retrieved. from the Internet on Feb. 16, 2015 at <URL: http://www.basfanimalnutrition.de/downloads/an_safe_feeding_en.pdf and http://www.basfanimalnutrition.de/en/news_2008_09_09.php>.

Supporting More Sustainable Livestock Production Luprosil & Amasil Less Spoilage, Improved Hygiene, product brochure from BASF Chemicai Company, believed published at least as early as 2011, Retrieved from the Internet on Feb. 16, 2015 at <URL: http://www.newtrition.basf.com/web/global/de/function/conversions:/publish/content/microsites/animal-nutrition/Sustainability_Contribution/assets/Luprosil_Amasil.pdf>.

Activate & Activate WD Max Product information avaiiable from Nevus, beiieved published at least as early as 2011, Retrieved from the Internet on Feb. 16, 2015 at http://novusintqa.enlivenhq.com/Products/activate#fndtn-activatewdmax.

Feed Preservation with formic acid from BASF, product information avaiiabie from BASF Chemical Company, believed to be pubiished at least as early as 2011, Retrieved from the Internet on Feb. 16, 2015 at <URL: http://www.intermediates.basf.com/chemicals/formic-acid/feed-preservation>.

The Great Preserver—Propionic Add protects food and animal feed from mold-rising demand, product information available from BASF Chemical Company, believed to be published at least as early as 2011, Retrieved from the Internet on Feb. 16, 2015 at <URL: http://www.intermediates.basf.com/chemicals/topstory/propionsaeure>.

Organic Adds, product information avaiiable from BASF Chemical Company, beiieved to be published at least as early as 2011, Retrieved from the Internet on Feb, 16, 2015 at <URL: http://www.animal-nutrition.basf.com/web/global/animal-nutrition/en_GB/Products/OrganicAcids/index>.

Dosatron Water Powered Dosing Technology D 25 Range—product brochure available from Dosatron International, published 2007. Retrieved from the Internet on Feb. 16, 2015 at <URL: https:1/bd.dosatron.com/Products_Produits/RangeSheets_FichesGamme/D25/Rangesheet_FichesGamme_D25_EN.pdf>.

Seiko-pH Health Promoter water, Three Steps to Improve intestinal health via drinking water, product information available from Seiko, believed to be published at least as early as 2011, Retrieved from the Internet on Feb. 16, 2015 at <URL: http://www.amcra.be/sites/default/files1Jaco%20Eisen%20Selko%20Feed%20Additives.pdf>.

Seiko-pH product information available from Seiko, believed to be published at least as eariy as 2011, Retrieved from the Internet on Feb. 16, 2015 at <URL: http://www.selko.com/en/products/selko-ph/9129>.

Fortify Liquid, MSDS information avaiiable from Assist Natural Products and Services, LLC, beiieved to be pubiished at least as early as 2013, Retrieved from the Internet on Feb. 16, 2015 at <URL: http://www.assist-nps.com/fileslFortify%20Liquid%20MSDS.pdf>.

Kem San Brand Liquid Antimicrobial, product specification available from Kem in Vet Innovations, Inc., 2100 Maury Street, Des Moines, Iowa 50317, published 2011.

Optimizer Proven in the lab . . . confirmed in the field, product brochure availabie from Pacific Vet Group-USA, Inc., 2135 Creek View Drive, Fayetteville, Arkansas 72704, published 2011.

Kemin's Acid-Lac Brand Liquid, Water Treatment for Total Gut Health, Data Sheet, believed to be published at least as early as 2011.

Swine Bluelite 2Bw a water soluble acidified electrolyte product with probiotics for pigs, product information available from TechMix Global, believed to published at least as early as 2013 (product available since 2011 ), Retrieved from the Internet on Feb. 16, 2015 at <URL: https://www.techmixglobal.com/swine-bluelite-2bw>.

Swine Bluelite 2Bw a water soluble acidified electrolyte product with probiotics for pigs, product information available from TechMix Global, 740 Bowman St., Stewart, MN, believed to published at least as early as 2013 (product available since 2011).

Cutting, Simon M., Bacillus Probiotics, Food Microbiology, 2011, vol. 28, pp. 214-220.

Wikipedia, "Sodium chloride", Nov. 1, 2017, retrieved on Apr. 5, 2019 from https://en.wikipedia.org/w/index.php?title=Sodium_chloride&oldid=808219406, pp. 1-9.

\* cited by examiner

Graph of nitrate levels over the three month study period

Graph of ortho phosphate levels over the three month study period

Graph of turbidity (FAU) over the course of the study.

METHOD FOR IMPROVING QUALITY OF AQUACULTURE POND WATER USING A NUTRIENT GERMINANT COMPOSITION AND SPORE INCUBATION METHOD

CROSS-REFERENCE TO RELATED APPLICATION

This application is a continuation-in-part of U.S. application Ser. No. 14/720,088 filed on May 22, 2015, which claims the benefit of U.S. Provisional Application Ser. No. 62/002,476 filed on May 23, 2014. This application is also a continuation-in-part of U.S. application Ser. No. 15/479,773 filed on Apr. 5, 2017, which claims the benefit of U.S. provisional patent application No. 62/318,587 filed Apr. 5, 2016.

BACKGROUND OF THE INVENTION

1. Field of the Invention

This invention relates to the treatment of aquaculture pond water with bacteria germinated in a nutrient germinant composition and using a point-of-use spore incubation method to reduce organic waste, ammonia, and disease pressure in a water livestock application and to provide probiotics to aquaculture species.

2. Description of Related Art

Aquaculture refers to the raising of aquatic species that are used as a human or animal food source. The technique applies some types of control to the natural environment of the raised species to improve overall harvests. This can include the artificial hatching of species to increase the commercial harvest of animals in the wild, hatching and raising of the species in enclosed ponds, and the hatching and raising of species in tidally drained enclosed areas adjacent to the shoreline. Problems associated with this process include: pollution that is discharged from the raising facility and will deteriorate the water quality around; loss of product due to deteriorated water quality in the raising facility; and increased disease pressures associated with pathogenic microorganisms in the raising facility. Such problems may be identified through testing or monitoring a variety of parameters, including pH, conductivity, ammonia, nitrate, phosphate and alkalinity. Conductivity is an indicator of salt content, amounts greater than 1200 ppm is no longer considered fresh water; an ideal amount is 700 ppm and range of 300-1200 ppm. Ammonia levels measure the amount of available oxygen for fish. High levels of ammonia block oxygen transfer in fish from gills to the blood; however it is also a product of their metabolic waste. While ammonia from fish waste is often not concentrated enough to be toxic itself, fish farmers must closely monitor ammonia levels due to the high concentration of fish per pond. Oxygen is consumed by nitrifying bacteria in the pond which break down the toxic ammonia to a non-toxic form; however, this massive use of oxygen reduces the oxygen available for uptake by fish. Ammonia levels >1 ppm are considered toxic for fish life. Additionally, nitrate levels are examined to determine the amount of plant fertilizer in the water. Nitrate is highly leachable from the surrounding soil and can be harmful to small children and pregnant women. Nitrate becomes nitrite in the GI tract and interacts with the blood's ability to carry oxygen. Max contamination level for nitrate is 10 ppm. Alkalinity is the measure of a pond's or lake's ability to neutralize acid without a change in pH. Alkalinity will decrease over time due to bacteria; however an ideal level is 100 ppm with acceptable range of 50-200 ppm. Phosphate found in ponds and lakes is largely from human and animal waste. Fertilizer run-off is a major source of phosphate found in golf course and decorative ponds. Elevated levels cause an increased rate of eutrophication which in turn increases sludge production. Moderate levels of phosphate can stimulate plant growth causing an increase in algae production; levels of >0.1 ppm is an indication of accelerated plant growth and is considered outside acceptable levels.

Current technologies to address these problems include bioremediation, antibiotics, and chemical additives. Typical bioremediation technologies include the application of supplemental bacteria to the water to enhance the microbiological activities to improve the water quality. It is also known to use nitrifiers to enhance the nitrification process to convert the toxic ammonia into non-toxic nitrate. Chemical additives are added to improve the water quality and aid the microbiological activities by providing extra nutrients and alkalinity. Antibiotics are added to inhibit the growth of the pathogenic microorganisms. Problems associated with the current technologies include high cost and poor water quality improvement performance with the inactive supplemental bacteria, low nitrification activities due to the existence of organic waste and lack of nitrifier growing sites, and bioaccumulation of antibiotics in the raised aquatic species.

According to preferred methods disclosed in U.S. application Ser. No. 14/720,088, active bacteria may be generated on-site using a biogenerator to grow the bacteria to a useful population from a solid bacteria starter material. The active bacteria may then be discharged into an aquaculture application from one or more biogenerators. Such biogenerators and their methods of use are disclosed, for example, in U.S. Pat. Nos. 6,335,191; 7,081,361; 7,635,587; 8,093,040; and 8,551,762, the contents of which are incorporated by reference into this disclosure. However, it would be useful to have an alternate method of generating active bacteria from spores at the point of use in an aquaculture application.

Spore germination is a multistep, causative process wherein spores effectively wake-up or are revived from a dormant state to a vegetative growth state. The first step is one by which spores are activated and are induced to germinate, typically by an environmental signal called a germinant. This signal can be a nutrient such as an L-amino acid. Nutrient germinants bind to receptors in the inner-membrane of the spore to initiate germination. Additionally, sugars have been shown to increase the binding affinity of L-amino acids for their cognate receptors.

The germinant signal then initiates a cascade that causes the release of Dipicolinic Acid (DPA), which is stored in a 1:1 ratio with $Ca^{2+}$ (CaDPA) in the core of the spore. The release of CaDPA is a fast process and is typically >90% complete in 2 min. CaDPA release represents a point of no return for spores in which they are committed to the germination process. Those knowledgeable in the art refer to this step as the "commitment" step.

After CaDPA release, the spore is partially hydrated and the core pH rises to approx. 8.0. The core of the spore then expands and the cortex (composed mostly of peptidoglycan) is degraded by core lytic enzymes. The spore absorbs water and consequently loses its refractivity. This loss of refractivity towards the end of the germination process allows spore germination to be monitored via phase-contrast microscopy.

The second phase of germination is an outgrowth step in which the spore's metabolic, biosynthetic, and DNA replication/repair pathways initiate. The outgrowth period has several phases. The first is known as a ripening period in which no morphological changes (such as cell growth) occur, but the spore's molecular machinery (e.g. transcription factors, translation machinery, biosynthesis machinery, etc.) is activated. This period can vary in length based on the initial resources that are packaged with the spore during the process of sporulation. For instance, the preferred carbon source of several *Bacillus* species (including *subtilis*) is malate and *Bacillus* spores typically contain a large pool of malate that is used during the revival process. Interestingly, deletion mutants that cannot utilize the malate pool display an extended ripening period compared to wild-type spores indicating that the spore malate pool is sufficient to energize the initial outgrowth process. Additionally, spores store small, acid-soluble proteins that are degraded within the first several minutes of revival that serve as an immediate source of amino acids for protein synthesis. After the outgrowth step, spore revival is complete and cells are considered to be vegetatively growing.

It is known that spores can be induced to germinate via heat-activation. Spores of various *Bacillus* species have been heat-activated at strain-specific temperatures. For example, *B. subtilis* spores have been heat-activated at 75° C. for 30 minutes while *B. licheniformis* spores have been heat-activated at 65° C. for 20 minutes. The heat-activation has been shown to cause a transient, reversible unfolding of spore coat proteins. Heat-activated spores can then be germinated for additional time in germination buffers containing nutrient germinants, such as L-alanine. If no nutrient germinant is present, however, spores will return to their pre-heated, non-germinated state.

It is also known that germination can occur at ambient temperatures (near typical room temperature) without heat-activation and with a germination buffer containing nutrients, but the process usually takes longer than with heat-activation. For example, *B. licheniformis* and *B. subtilis* spores will germinate at 35° C. or 37° C., respectively, but it takes a longer period of time (e.g. 2 hours) in a germination buffer containing nutrient germinants. Additionally, non-heat-activated spores of *B. subtilis* have been known to have been germinated in non-nutrient germinant conditions (e.g. $CaCl_2 + Na_2DPA$) for an extended period of time.

It is also known to combine the use of heat activation and a nutrient germinant to germinate spores in a two-step process in laboratory settings. The spores are first heat activated by incubating for a period of time (e.g. 30 minutes) at a temperature in the range of 65-75° C. (this specific temperature is species dependent). Then, the spores are transferred into a buffer solution that contains a nutrient germinant, such as L-alanine. It is also known to grow bacteria in a growth chamber located near a use site by feeding pelletized nutrient material (containing sugar, yeast extract, and other nutrients that are not direct spore germinants), bacteria starter, and water into a growth chamber at a controlled temperature range of 16-40° C., and more preferably between 29-32° C., for a growth period of around 24 hours as disclosed in U.S. Pat. No. 7,081,361.

There is a need for a rapid spore incubation and activation method that will allow generation of active bacteria, such as *Bacillus* species, in a single step at a point-of-use location where the bacteria will be discharged into an aquaculture application. Accordingly, this invention describes a simple method for spore germination using a nutrient germinant concentrate combined with a spore composition, or using a nutrient spore composition, simultaneously with heat incubation in a single step for use in aquaculture applications.

SUMMARY OF THE INVENTION

The method of the invention provides a cost-effective approach to delivering active bacteria to pond water (or a growing pond) in an aquaculture facility to degrade the organic waste and inhibit the growth of pathogenic microorganisms without bioaccumulation. The method of the invention reduces disease pressure in the water livestock, resulting in improved harvests of the species raised in the aquaculture operation. The addition of a nitrification enhancement agent as disclosed here as part of the method provides a steady alkalinity source and extra growing sites for the nitrifier to promote the nitrification activity and ammonia reduction.

The method of the invention desirably includes the delivery of active bacteria, optionally including a probiotic bacteria, most preferably generated from an on-site incubator using a liquid nutrient germinant concentrate and bacteria in spore form, into an aquaculture application. A nutrient-germinant composition according to one preferred embodiment of the invention comprises one or a combination of many L-amino acids, optionally D-glucose (which increases the binding affinity of L-amino acids for their cognate receptors in the spore coat), and a neutral buffer such as a phosphate buffer, and an industrial preservative, such as the commercially available Kathon/Lingaurd CG (which has active ingredients comprising methyl chloro isothiazolinone and methyl isothiazolinone). A nutrient-germinant composition according to another preferred embodiment of the invention comprises one or a combination of two or more L-amino acids, optionally D-glucose (which increases the binding affinity of L-amino acids for their cognate receptors in the spore coat), HEPES sodium salt (a biological buffer to provide the proper pH for spore germination), and an industrial preservative, such as a combination of propylparaben and methylparaben or other U.S. federal GRAS (Generally Regarded As Safe) preservatives. According to another preferred embodiment, the spore composition also comprises a source of potassium ions, such as potassium chloride or monopotassium phosphate or dipotassium phosphate. According to another preferred embodiment, the spore composition includes both D-glucose and D-fructose.

According to another preferred embodiment, a nutrient germinant composition also comprises spores of one or more bacteria species, preferably *Bacillus* species but other bacteria may also be used, and includes a germination inhibitor, such as NaCl, industrial preservatives, or D-alanine, in combination with any of the previously described spore composition ingredients. The germination inhibitor prevents the spores from germinating prematurely in the nutrient-germinant composition. The germination inhibitor may include chemicals that prevent spore germination such as NaCl, industrial preservatives, or D-alanine.

Alternatively, bacterial spores may be separately provided and added to a nutrient-germinant composition according to the invention at the point-of-use and incubation. When separately added, it is preferred to provide a stable spore suspension spore composition comprising one or more bacteria species, preferably *Bacillus* species. According to one preferred embodiment, a spore composition comprises bacteria spores, about 0.00005 to 3.0% by weight surfactant, about 0.002 to 5.0% by weight thickener, and optionally about 0.01 to 2.0% by weight of acidifiers, acids, or salts of acids (including those used as a preservative or stabilizer), with the balance being water. According to another preferred embodiment, a spore composition comprises bacterial spores, about 0.1 to 5.0% by weight thickener, about 0.05 to 0.5% by weight acids or salts of acids, optionally about 0.1-20% by weight water activity reducers, and optionally about 0.1% to 20% additional acidifier (acids or salts of acids), with the balance being water.

Most preferably, the bacterial spores in both preferred spore composition embodiments are in a dry, powder blend of 40-60% salt (table salt) and 60-40% bacteria spores (prior to adding to the spore composition) that combined make up about 0.1 to 10% by weight of the spore composition. The spore compositions preferably comprise around $1.0 \times 10^8$ to around $3.0 \times 10^8$ cfu/ml of the spore composition (spore suspension), which when diluted with drinking water (for animal watering applications) provide around $10^4$ to $10^6$ cfu/ml bacterial strains in the drinking water. Most preferably, the thickener in both preferred embodiments is one that also acts as a prebiotic, such as xanthan gum, to provide additional benefits. Although other commercially available spore products may be used, preferred spore compositions for use with the invention are as disclosed in U.S. application Ser. No. 14/524,858 filed on Oct. 27, 2014, which is incorporated herein by reference.

According to another preferred embodiment, a nutrient germinant composition according to the invention is in concentrated form and is diluted to 0.01% to 10% strength in water or another diluent at the point-of-use. The use of a concentrated formula reduces shipping, storage, and packaging costs and makes dosing of the spore composition at the point-of-use easier. Most preferably, the concentrated spore composition is in a liquid form, which is easier and faster to mix with diluent at the point-of-use, but solid forms such as pellets or bricks or powder may also be used. The inclusion of a general, industrial preservative in the spore composition aids in long-term storage and/or germination inhibition, which is particularly useful when the spore composition is in the preferred concentrated form.

In another preferred embodiment, the present invention comprises a method of germinating spores of *Bacillus* species using a nutrient germinant composition combined with a spore composition or using a nutrient spore composition at an elevated temperature; preferably in a range of 35-60° C., more preferably in the range of 38-50° C., and most preferably in the range of 41° C. to 44° C. for a period of time (an incubation period). The incubation period preferably ranges from 2-60 minutes, or longer, depending on the application. Most preferably, a nutrient-germinant composition or nutrient spore composition in concentrated form according to preferred embodiments of the invention are used in the incubation/germination methods of the invention, but other nutrient-germinant compositions and spore compositions may also be used. Preferably, the incubation method is carried out at or near the point-of-use—the aquaculture site or near the aquaculture site where the germinated spores will be used or consumed and further comprises dispensing the germinated spores to the point-of-use/consumption. Preferred methods according to the invention may be carried out in any incubation device that has a reservoir capable of holding a volume of spores (if separately added), liquid (typically water as a diluent), nutrient-germinant composition and that is capable of heating the mixture during an incubation period. Most preferably, the methods are carried out in a device that is also capable of mixing those ingredients, automatically shutting-off heating at the end of the incubation period, and automatically dispensing an incubated bacteria solution comprising the bacteria to an aquaculture point-of-use/consumption. Preferred methods may also be carried out as a batch process or as a continuous process. Although spore compositions according to the invention are preferably used, any variety of spore forms or products, such as dried powder form, a liquid suspension, or a reconstituted aqueous mixture, may be used with the method of the invention.

The preferred embodiments of the invention allow for rapid germination of spores of *Bacillus* species at an aquaculture point-of-use. The active, vegetative bacteria solution discharged from the incubator can be supplied directly to growing ponds or can be accumulated and diluted with pond water or another similarly suitable diluent, such as water from a municipal water system, prior to discharging it into growing ponds. Alternatively, the incubator may be configured to heat a nutrient germinant composition and spores, or a nutrient spore composition, for an incubation period and temperature range that will produce bacteria in a metastable state, between dormant spores and vegetative bacteria. The metastable bacteria solution is then discharged into the growing pond where the bacteria are able to become active, vegetative bacteria. Dilution may aid in delivery of the treatment solution flowing from the incubator to the growing pond, if the incubator is located some distance from the growing pond. The active bacteria will degrade the organic waste and inhibit the growth of the pathogenic microorganisms in the water in the aquaculture facilities, without requiring the addition of (or reducing the amount of) chemical treatments and antibiotics used in the growing pond.

The invention also desirably includes contemporaneous application of at least one nitrification enhancement agent to the growing ponds. Nitrification enhancement agents increase the activity of nitrifying bacteria naturally found in the water to decrease the ammonia level. These nitrification agents comprise alkalinity enhancement agents that increasing the alkalinity of the water, which is necessary for nitrification (7 parts alkalinity to 1 part ammonia) and/or surface area modifying agents to add surfaces for nitrifying bacteria to grow, since nitrifying bacteria grow as biofilms and need surfaces to which they can attach. The alkalinity enhancement agents can include, for example, calcium carbonate, calcified seaweed or other similarly effective additives. These agents can be added at a higher-than-dissolution amount to provide a continuing source of alkalinity as they slowly dissolve. Certain nitrification agents, such as calcified seaweed act as both an alkalinity enhancement agent and a surface area modifying agent by providing both alkalinity and high surface area, providing a support surface for biofilms of nitrifiers to grow. Calcified seaweed also acts as a source of micronutrients for the bacteria. Other nitrification enhancement agents only act as surface area modifying agents, such as plastic or metal pieces, or other similarly effective materials to increase the surface area over which favorable reactions and interactions can occur. One or more agents that act only as surface area modifiers (and not alkalinity enhancers) may also be added to the growing pond, either alone or preferably in combination with one or more alkalinity enhancement agents; however, an agent that acts only as a surface area enhancer would not degrade in the growing pond and would not be added with each batch of bacteria solution. Such agents that act only as surface area modifiers would preferably only be added to a growing pond once. Agents that act as alkalinity enhancement agents would be added to the growing pond contemporaneously with a batch of bacteria on a periodic basis, such as seasonally (once per season or once every summer, twice per year, etc.) or as needed. As used herein, the term "contemporaneous" is intended to mean "at or about" the time that a batch of vegetative bacteria and other components or agents are added to the growing pond or other growing medium in which aquatic species are grown at an aquaculture facility.

BRIEF DESCRIPTION OF THE DRAWINGS

The system and method of the invention are further described and explained in relation to the following drawings

DESCRIPTION OF THE PREFERRED EMBODIMENTS

Aquaculture Treatment Methods

According to one preferred embodiment, active bacteria are generated on site from a nutrient germinant composition combined with a spore composition or from a premixed nutrient spore composition, preferably using an incubator system and a preferred germination method as described below, and the active bacteria are periodically fed into a growing pond in an aquaculture application. One or more nitrification enhancement agents are also contemporaneously added to the growing pond with the active bacteria.

Figure 1:
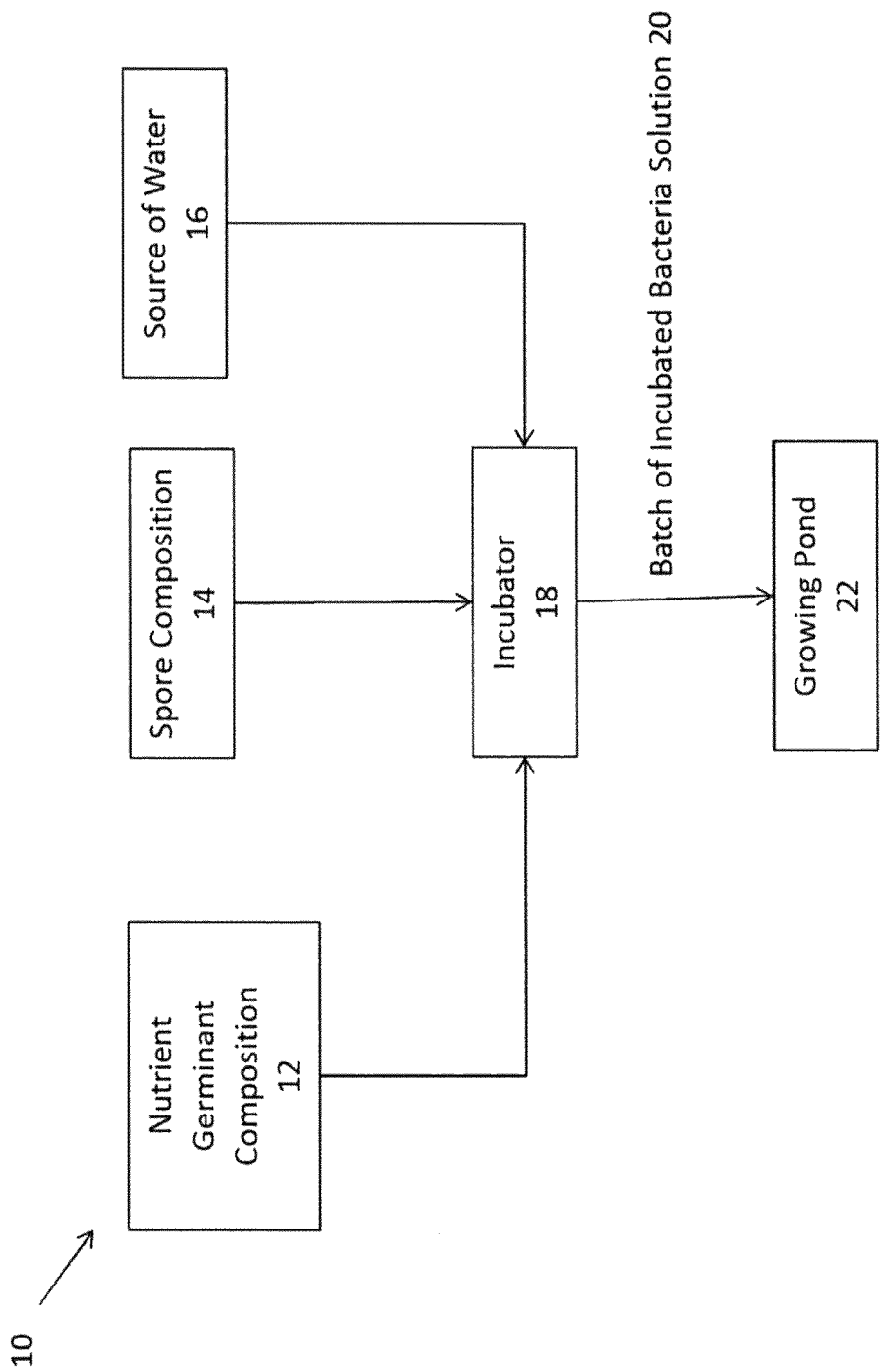
FIG. 1 is a flow diagram for an incubation system and method according to a preferred embodiment of the invention.

A satisfactory bacteria growing and delivery device for use in the method of the invention will include an on-site incubator system, such as an air incubator, a water incubator, or any other chamber or similar device that provides even, constant heat at a given temperature range as needed to germinate the spores for discharge into the aquaculture application. Referring to FIG. 1, preferably, the on-site incubator system 10 contains one or more tanks or holding containers for holding an initial volume of nutrient germinant composition 12 and an initial volume of bacteria spore solution 14 (if the bacterial spores are not included in the nutrient germinant composition). These spore compositions may also arrive at the site of use in containers that are connectable in fluid communication with the incubator, in which case separate tanks or containers are not needed. A source of water 16 at or near the aquaculture site is also optionally, but preferably, connectable in fluid communication with the incubator system. A well, source of municipal water supply, or the growing pond may provide water 16 to the incubator 18. An incubator system 10 also preferably comprises a chamber or container 18 configured to receive a portion of the nutrient germinant composition and spores and allow them to be heated to germinate the spores; a heater; valves, tubing, and pumps (as needed, if gravity flow is not sufficient) to allow the nutrient germinant composition 12, bacteria spore solution 14, and optionally water 16 to flow from their storage containers/source into a heating chamber or container 18 and to discharge an incubated bacteria (or activated bacteria) solution 20 from the heating chamber or container 18 and deliver it to the growing pond 22; an optional mixer within the heating chamber or container 18, and a controller or timer to activate the valves, pumps, optional mixer, and heater to control influx of the nutrient and spore compositions into the heating chamber, incubation time and temperature, and discharge to the growing pond. Most preferably, the on-site incubator system 10 uses a nutrient germinate composition combined with a bacteria spore composition (as described below) or uses a nutrient spore composition (a nutrient germinant composition pre-mixed with bacteria spores, also as described below) (either are also referred to herein as "starter material"), to generate an incubated bacteria solution 20 to be discharged into the growing pond 22.

Figure 2:
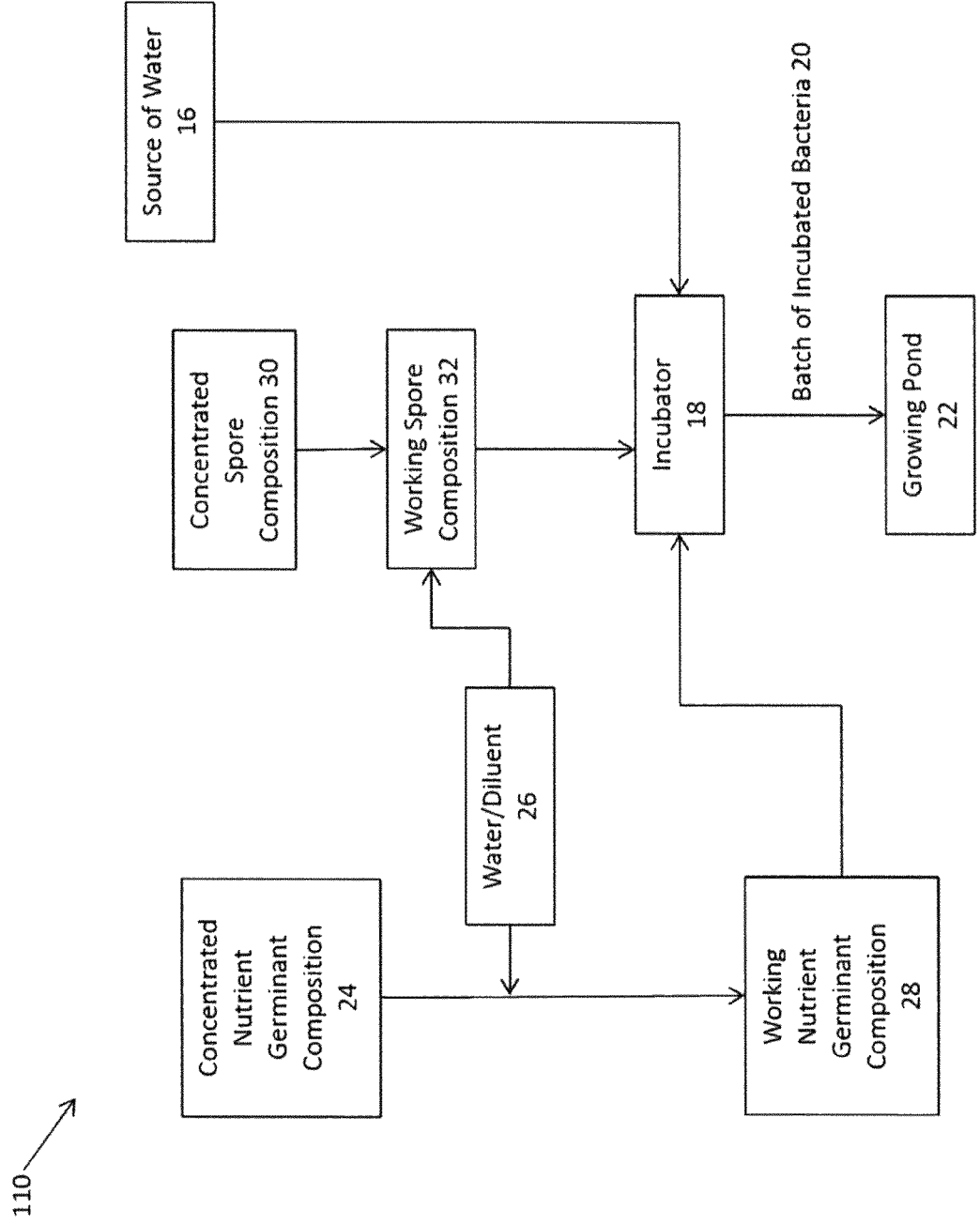
FIG. 2 is a flow diagram for an incubation system and method according to another preferred embodiment of the invention.
Figure 3:
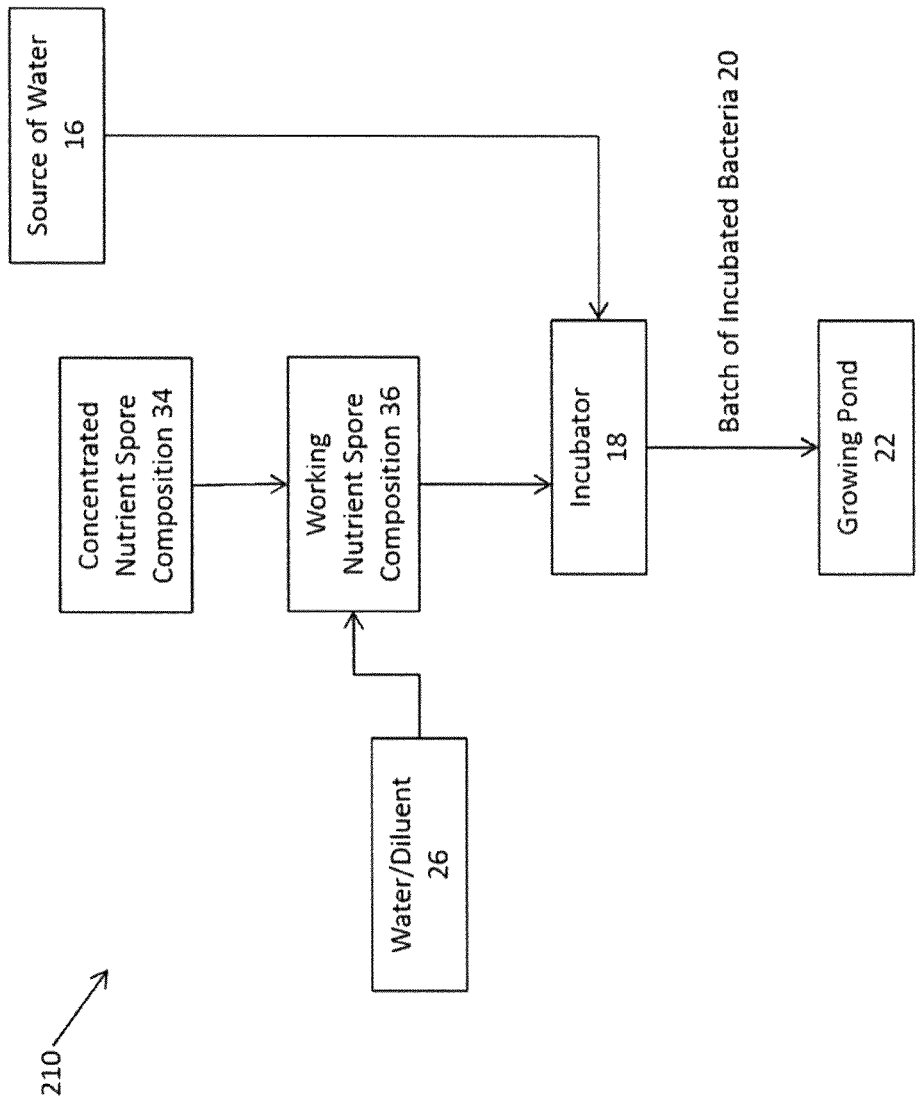
FIG. 3 is a flow diagram for an incubation system and method according to another preferred embodiment of the invention.

Alternatively, according to another preferred embodiment as shown in FIG. 2, incubator system 110 uses concentrated nutrient germinant composition 24 and concentrated spore composition 30, which are diluted with a diluent or water from container/source 26 to form a working nutrient germinant composition 28 and a working spore composition 32, a portion of each being fed into incubator 18 to generate a batch of activated bacteria 20. Water from source 16 may also be used as a source of diluent in place of or in addition to source 26. Additionally, only one of the nutrient germinant composition 24 or spore composition 30 may be in concentrated form and require dilution prior to feeding into incubator 18. According to another preferred embodiment, when only one is concentrated, the non-concentrated composition may be used as a diluent for the concentrated composition in addition to or in place of water/diluent from source 26 and/or source 16. According to another preferred embodiment, a concentrated nutrient spore composition 34 is used with system 210 as shown in FIG. 3. The concentrated nutrient spore composition is diluted with water/diluent from source 26 and/or source 16 to make a working nutrient spore composition 36 prior to feeding into incubator 18 to generate a batch of activated bacteria 20. Alternatively, a nutrient spore composition may not be in concentrated form and not require any diluent prior to feeding into incubator 18 (similar to direct feeding of nutrient germinant composition 12 in FIG. 1), in which case water/diluent source 26 is not needed. Water from source 16 may still be optionally fed into incubator 18 as needed in this alternate embodiment. With any of the incubator system embodiments, diluent may be fed into incubator 18 to dilute a concentrated composition within the incubator rather than prior to feeding the incubator. Any combination of elements from systems 10, 110, and 210 may be used together, as will be understood by those of ordinary skill in the art.

Preferably, bacteria spores are germinated in incubator 18 or other suitable heating device according to preferred germination methods described herein. According to one preferred embodiment, a nutrient germinant composition and spore composition (or nutrient spore composition) are heated in incubator 18 to a temperature in a range of 35-55° C., more preferably in the range of 38-50° C., and most preferably in the range of 41° C. to 44° C. The incubation period can vary depending on the end-use application, but is preferably between around 20 minutes to 60 minutes to generate active bacteria for an aquaculture application and most preferably around 2 minutes to 5 minutes for a probiotic application to generate metastable state bacteria. To provide additional growth time for vegetative bacteria, the incubation period may be around 4 to 6 hours.

Depending on the desired use of the bacteria in the aquaculture application, such as use to treat the water or a probiotic for the aquatic species, different incubation periods may be used to provide an incubated bacteria solution that is primarily still spore form bacteria, primarily metastable state bacteria (in which the spores are neither dormant nor in the vegetative growth phase, also referred to herein as an activated state), or primarily fully vegetative bacteria. Additionally, when fully vegetative bacteria are desired, the bacteria solution may be held within the incubator 18 or another intermediate container for a period of time after the incubation period to allow the bacteria multiply prior to discharging into the aquaculture application. Most preferably, the bacteria solution will be maintained at a temperature between 30 to 45° C., more preferably, the vegetative bacteria solution will be heated as necessary to maintain the temperature of the solution in the range of 33 to 42° C., and most preferably in the range of 36° C. to 39° C. to facilitate growth during this post incubation growth period. When a probiotic application is desired, the bacteria remain primarily in the spore state or metastable state when discharged to the aquaculture application by using a shorter incubation period, which gives the bacteria a better chance of surviving through to the aquatic species' intestinal tract where they are most beneficial as probiotics. At the end of an incubation period, an incubated bacteria solution 20 is discharged to the growing pond. An incubated bacteria solution 20 may comprise fully vegetative bacteria, metastable state bacteria, spores, or a combination thereof depending on the species of bacteria used, incubation temperature, incubation time, and content of the nutrients used.

Each batch of incubated bacteria solution 20 comprises around $1\times10^8$-$1\times10^{10}$ cfu/mL of metastable state, vegetative bacteria species, and/or spores. Once discharged into growing pond 22, the amount of bacteria in each batch is diluted based on the amount of water in the growing pond. Most preferably, sufficient quantities of bacteria solution 20 are added to the growing pond 22 to provide an effective amount of activated bacteria based on the dilution in the growing pond. In this context, "effective amount" can refer to the amount of bacteria and/or nutrient composition that can be effective to improve performance of a plant or animal after administration. An improvement in performance can be measured or evaluated by monitoring one or more characteristics, including but not limited to water quality: clarity of water, ammonia levels, nitrite levels, nitrate levels, disease incidence, mortality, harvest weight, meat quality, individual animal size, premium weights, antibiotic use, and additive use. "Effective amount" can also refer to the amount that can reduce the amount of, competitively exclude, and/or eliminate one or more species of pathogenic bacteria (including, but not limited to *Escherichia coli* and *Salmonella*) in the intestines of an animal. "Effective amount" can also refer to the amount that can reduce $NH_3$ and/or $H_2S$ levels, such as that which can be excreted by an animal into its environment.

According to one preferred embodiment for use in shrimp aquaculture applications, the effective amount of the bacteria in the growing pond can be about 1 to about $9\times10^2$ CFU/mL. According to another preferred embodiment, the effective amount for shrimp aquaculture applications is about 1 to about $9\times10^2$ to about $10^8$ CFU/mL. According to another preferred embodiment, the effective amount of the incubated bacteria in the growing pond can range from about 0.001% to about 2% v/v of the total amount of water in the growing pond and any range or value therein. As another example, around 500 mL of incubated bacteria solution comprising around $1\times10^9$-$1\times10^{10}$ cfu/mL of bacteria species dosed to a growing pond four times per day will be sufficient treat a growing pond containing 100,000 gallons of water. Other volumes of bacteria solution and dosing intervals may be used to treat growing ponds, depending on the size of the pond, based on pond conditions, aquatic species, temperature of the pond, and other factors to achieve a desired effective amount of bacteria in the pond as will be understood by those of ordinary skill in the art.

Multiple incubator systems 10, 110, or 210 may be provided to provide larger quantities of incubated bacteria solution to the growing pond to achieve the desired effective amount being added to the pond, to provide different species of bacteria to the growing pond or at different times or rates, and/or to space out the discharge of incubated bacteria solution around the perimeter of the growing pond to aid in dispersing the bacteria through the pond. A pump or other mixing device may also be added to the growing pond (if not already in place) to aid in dispersing the incubated bacteria solution (and nitrification enhancers or surface area enhancers) throughout the growing pond.

The on-site incubator is preferably configured to incubate multiple batches of incubated bacteria solution from a container of a nutrient germinant composition/spore composition or nutrient spore composition, so that multiple batches of bacteria can be discharged at periodic intervals over a prolonged period of time before the starter material needs to be replenished. For example, a container of nutrient germinant composition 12 may initially hold 0.3 to 3 liters of nutrient germinant composition that may be fed to an incubator in incremental amounts of around 10 to 100 mL every 1 to 24 hours. A container of concentrated nutrient germinant solution 24 may initially hold 0.2 to 1 liters of solution, be diluted with water/diluent from source 26 or 16 to a ratio of around 1:50 to around 1:10 concentrate to water/diluent to feed an incubator in incremental amounts of around 0.1 to 200 mL of working nutrient germinant solution 28 every 1 to 24 hours. A container of bacteria spore solution 14 to be fed separately with a nutrient germinant composition may initially hold 0.6 to 6 liters of solution that may be fed to an incubator in incremental amounts of around 20 to 200 mL every 1 to 24 hours. A container of concentrated bacteria spore solution 30 may initially hold 0.15 to 6 liters of solution, be diluted with water/diluent from source 26 or 16 to a ratio of around 1:10 to around 1:3 concentrate to water/diluent to feed an incubator in incremental amounts of around 5 to 200 mL of working spore solution 32 every 1 to 24 hours. A container of nutrient spore composition may initially hold 3 to 6 liters of nutrient germinant composition that may be fed to an incubator in incremental amounts of around 100 to 200 mL every 1 to 24 hours. A container of concentrated nutrient spore solution 34 may initially hold 0.3 to 3 liters of solution, be diluted with water/diluent from source 26 or 16 to a ratio of around 1:10 to around 1:50 concentrate to water/diluent to feed an incubator in incremental amounts of around 10 to 100 mL of working nutrient spore solution 36 every 1 to 24 hours. Each batch of nutrient germinant composition/bacteria spores or nutrient spore composition is then incubated in the incubator, as discussed herein, to form an incubated bacteria solution that is discharged to an aquaculture application.

An incubated bacteria solution 20 is preferably discharged from one or more incubators 18 to the growing pond 22 once every 4 to 6 hours over the course of a treatment cycle. Other dosing intervals may be used depending on the size of the pond, conditions of the pond/aquatic species, and type of application. The time between doses may be varied as desired by varying the timing of addition of ingredients to the incubator and/or incubation time. An incubated bacterial solution may be discharged more frequently on a larger pond (e.g. 20 million gallons). For an aquaculture water treatment application, it is preferred to discharge an incubated solution having vegetative bacteria. To achieve vegetative bacteria, it is preferred to incubate for at least 4 to 6 hours before discharging to the growing pond, although longer incubation times to allow more time for the bacteria to multiply may also be used. For a probiotic application for aquatic species in an aquaculture application, it is preferred to incubate for around 2 to 5 minutes. In that application, an incubated bacteria solution 20 may be discharged multiple times a day, even as frequently as every 4 to 6 minutes, if needed for a large pond. The volume of nutrient germinant composition/spore composition or nutrient spore composition feeding the incubator is periodically replaced or replenished as needed. A treatment cycle is preferably continuous with the incubator running throughout the year (other than periodic shutdowns for maintenance or replenishment of the nutrient germinant composition).

Various *Bacillus* species, as described below, are preferably used with aquaculture treatment methods according to the invention, but other bacteria may also be used. For example, the genera of bacteria suitable for use in the method of the invention are believed to include any one or more species in the genera *Bacillus, Bacteroides, Bifidobacterium, Lueconostoc, Pediococcus, Enterococcus, Lactobacillus, Megasphaera, Pseudomonas* and *Propionibacterium*. Probiotic bacteria that may be generated on-site include any one or more of the following: *Bacillus amylophilus, Bacillus licheniformis, Bacillus pumilus, Bacillus subtilis, Bacillus amyloliquefaciens, Bacillus coagulans, Bacillus megaterium, Bacteroides ruminocola, Bacteroides ruminocola, Bacterioides suis, Bifidobacterium adolescentis, Bifidobacterium animalis, Bifidobacterium bifidum, Bifidobacterium infantis, Bifidobacterium longum, Bifidobacterium thermophilum, Enterococcus cremoris, Enterococcus diacetylactis, Enterococcus faecium, Enterococcus intermedius, Enterococcus lactis, Enterococcus thermophiles, Lactobacillus brevis, Lactobacillus buchneri, Lactobacillus bulgaricus, Lactobacillus casei, Lactobacillus cellobiosus, Lactobacillus curvatus, Lactobacillus delbruekii, Lactobacillus farciminis, Lactobacillus fermentum, Lactobacillus helveticus, Lactobacillus lactis, Lactobacillus plantarum, Lactobacillus reuteri, Leuconostoc mesenteroides, Megasphaera elsdennii, Pediococcus acidilacticii, Pediococcus cerevisiae, Pediococcus pentosaceus, Propionibacterium acidipropionici, Propionibacterium freudenreichii,* and *Propionibacterium shermanii*.

With at least one dose (or batch) of incubated bacteria solution discharged to the growing pond, one or more nitrification enhancement agents are preferably added contemporaneously. Alkalinity enhancing agents, including calcium carbonate or calcified seaweed, may be added periodically, such as seasonally or as needed to reduce phosphates, and not with each dose of bacteria. The agents can be added at a higher-than-dissolution amount to provide a continuing source of alkalinity as they slowly dissolve. Slowly dissolving alkalinity enhancing agents, such as calcified seaweed, also act as a surface area modifier, providing a support surface for biofilms of nitrifying bacteria to grow and they also aid in nutrient delivery. Additionally, agents that act only as surface area modifiers (such as pieces of metal or plastic) may be added to the growing pond as needed to reduce nitrogen or phosphorous, along with a batch or dose of incubated bacteria solution and one or more alkalinity enhancing agents, but there are preferably added only once and not with each dose of incubated bacteria solution. These surface enhancement agents similarly provide a support surface for biofilms of the added bacteria to grow, which aids in faster development of the beneficial bacteria. Most preferably, around 100 pounds of such nitrification enhancement agents are added per 7.5 million gallons of growing pond, and this amount may be scaled for other growing pond volumes. Preferred dispersal methods for the nitrification enhancement agents can include the use of automated devices or manual application to the water in the growing ponds. Automated or manually operated devices useful for broadcasting or otherwise dispersing at least one nitrification enhancement agent in the form of prills, pellets or granules are commercially available and are well known to those of skill in the art. Additionally, these nitrification enhancing agents may be dispersed through a pond using the self-dispersing additive system and method, which employs effervescent materials along with the treatment agent in water soluble packaging, described in U.S. patent application Ser. No. 14/689,790 filed on Apr. 17, 2015, which is incorporated herein by reference.

Suitable applications for the method of the invention include, for example and without limitation various types of aquaculture application such as hatcheries, ponds, and tidal flow aquaculture. The combined use of germinated or vegetative bacteria, preferably grown on-site, and at least one nitrification enhancement aid such as calcium carbonate, calcified seaweed or another material that is similarly effective for cost-effective treatment of water used in aquaculture applications to address organic waste, ammonia, and pathogenic microorganism as well as general water quality issues. The effectiveness of the subject method for achieving these objectives is believed to be further enhanced by the addition of calcified seaweed, or other plastic or metal pieces, particles or fragments that increase the available surface area upon which interactions or reactions can occur.

A laboratory study was conducted to evaluate the benefits of adding beneficial bacteria and nitrification enhancement agents to pond water. One goal of the study was to evaluate the efficacy of added bacteria (pond blend commercially available from EcoBionics) as inhibitory or herbicidal against algae production. This study employed the use of six 2 L beakers, each filled with 1.5 L of source water taken from an established fish tank with algae present. Each beaker also contained one gold fish from a source tank, air stone, light source that alternated 12 hours on, then 12 hours off, and watch glass cover to reduce loss to evaporation. A pond blend bacteria solution was generated in a BIO-Amp™ biogenerator using 37 g of Pond Plus pellets, rather than using an incubator and nutrient germinant composition according to preferred embodiments of the invention described below. After a 24 hour growth cycle in the biogenerator, an aliquot of bacteria solution was obtained and diluted to maintain a ratio of 3 L of pond blend:579024 gallons pond water, however, a preferred ratio to be employed in the field is 3 L of pond blend:100,000 gallons of pond water. Based on this ratio, around 0.4 µL of pond blend bacteria solution was added to specific of the beakers having 1.5 L of fish tank water. Calcified seaweed, was added to specific beakers according to manufacturer's instructions based on rates for clarification; this equated to 0.045 g of calcified seaweed per 1.5 L of water. An equal amount of calcium carbonate was added to some of the beakers. The additives in each beaker were as follows:

TABLE 1

| Beaker 1 | 0.4 µL of pond blend and 1.5 L of source water only |
| Beaker 2 | 0.045 g of calcified seaweed and 1.5 L of source water only |
| Beaker 3 | 0.4 µL of pond blend, 0.045 g of calcified seaweed, and 1.5 L of source water |
| Beaker 4 | 0.045 g of calcium carbonate and 1.5 L of source water only |
| Beaker 5 | 0.4 µL of pond blend, 0.045 g of calcium carbonate, and 1.5 L of source water |
| Beaker 6 | served as the negative control and contained only 1.5 L of source water |

Each test beaker was treated according to one preferred dosing schedule that would be utilized in the field. Beakers 1, 3 and 5 with pond blend would be treated (dosed) once per week with an additional 0.4 µL of pond blend. Depending on growing pond conditions, other dosing schedules may be used in the field. Calcified seaweed and calcium carbonate were added only once at the beginning of this study, however, additional dosing may be used in the field.

One pre-treatment sample (before the addition of pond blend bacteria solution, calcified seaweed or calcium carbonate) was taken from each beaker and analyzed to obtain a baseline for comparison to the post treatment results. Chemical analysis was performed once per week using 200-300 mL samples from each beaker. These weekly measurements included analysis of pH, conductivity, nitrate, ortho phosphate, total alkalinity and ammonia levels. Once per month turbidity was examined and photographs were taken to assess changes in algal growth and overall clarity. Treatment and analysis of the beakers was continued for a total of three months; again to mirror the length of the field study.

Data analysis was performed using Excel 2003, using a two sampled two-tailed t-test comparing pre-treatment vs. post-treatment numbers at 95% confidence level. The two sample two-tailed t-test tested the null hypothesis of no difference in the means of pre and post-treatment with an alternative hypothesis of there is a difference in the means.

$H_O$=µ pre-treatment=µ post-treatment $H_A$=µ pre-treatment≠µ post-treatment

Baseline readings indicated elevated phosphate levels in all beakers, over 40 times the level indicative of accelerated algal growth. All other measurements were within acceptable ranges.

TABLE 2

Results from Two Sample T-Test for Nitrate and Phosphate

| Beaker | Nitrate p-value | % Reduction Nitrate | Phosphate p-value | % Reduction phosphate |
|---|---|---|---|---|
| 1 (pond blend only) | 0.88 | 20 | 0.47 | 38 |
| 2 (Calcified Seaweed only) | 0.01* | 79 | 0.02* | 73 |
| 3 (pond blend + calcified seaweed) | 0.04* | 76 | 0.07 | 66 |
| 4 (Calcium carbonate only) | 0.03* | 77 | 0.05 | 66 |
| 5 (pond lend + calcium carbonate) | 0.24 | 52 | 0.02* | 72 |
| 6 (control) | 0.90 | 25 increase | 0.68 | 19 |

*Indicates a significant result

The test beaker containing only the bacterial blend pellets showed no statistically significant change over the three month study period. Phosphate levels dropped after two weeks but within one month returned to pre-treatment levels. Nitrate levels mirrored those of phosphate. Of all the test beakers, only beaker 1 had nitrate and phosphate levels rise similar to the negative control. This indicates a minimal effect on major chemical indicators of pond health when using bacteria alone.

The two beakers containing calcified seaweed showed statistically significant changes in pre vs. post-treatment means. There was a significant drop in nitrate levels of 79% and 76% with p-values 0.01 and 0.04 in beaker 2 and 3 respectively. Phosphate levels also dropped significantly in beaker 2 by 74% with a p-value of 0.02. The beaker containing calcified seaweed and pellets showed a phosphate reduction of 66%, however, this value was not significant (see Table 2). It is important to note that this lack of statistical significance may be subject to this study's low sample size limitation. This study did not test for changes in pathogenic bacteria in the samples, but the addition of the pond blend bacteria solution would be expected to reduce those numbers through competition. Additionally, it is believed that the addition of a bacteria solution from an incubator using a nutrient germinant composition into to an actual growing pond according to a preferred embodiment of the invention would achieve better results than in the laboratory study because the bacteria in the bacteria solution can act synergistically with the nitrifying bacteria already present in the growing pond and the added bacteria in the bacteria solution can aid in consuming waste in the water to reduce ammonia levels. Similar to the calcified seaweed beakers, the two beakers that contained calcium carbonate showed a significant difference in pre versus post treatment means. In beaker 4, the nitrate levels dropped 77% with a p-value of 0.03. While, beaker 5 which contained calcium carbonate and bacterial pellets showed a significant decrease in phosphate levels of 72%, p-value 0.02 (see Table 2). Calcium carbonate may be a suitable substitute for calcified seaweed in aquaculture treatment. Beakers with calcified seaweed or calcium carbonate out performed those without. Beaker 5, which contained bacterial blend pellets and calcium carbonate, had a significantly lower post-treatment mean of phosphate levels and the least effect on pH. However, beaker 2 and 5 had statistically significant drops in phosphate levels.

Figure 4:
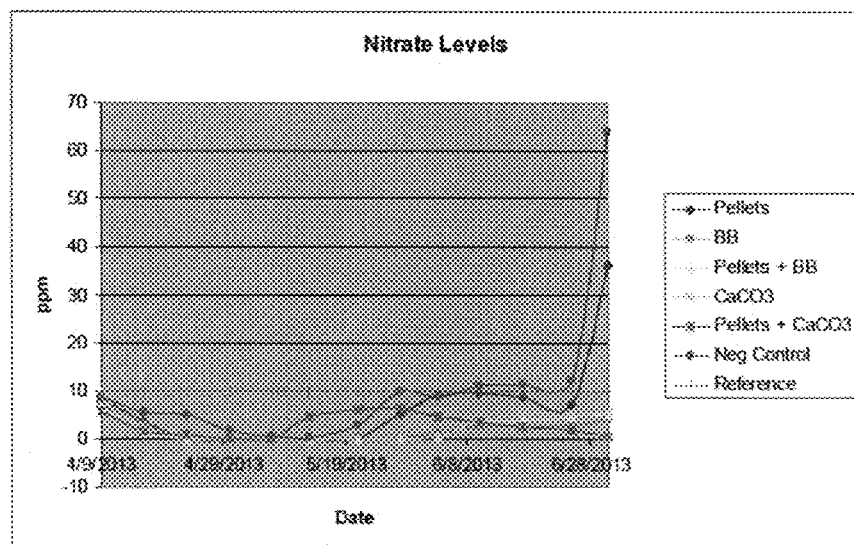
FIG. 4 is a graph of nitrate levels in a laboratory study.
Figure 5:
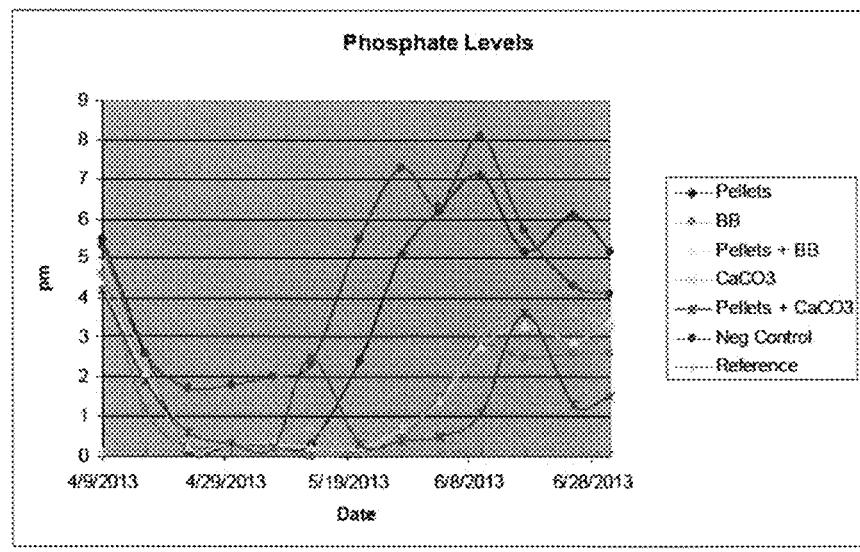
FIG. 5 is a graph of ortho-phosphate levels in a laboratory study.
Figure 6:
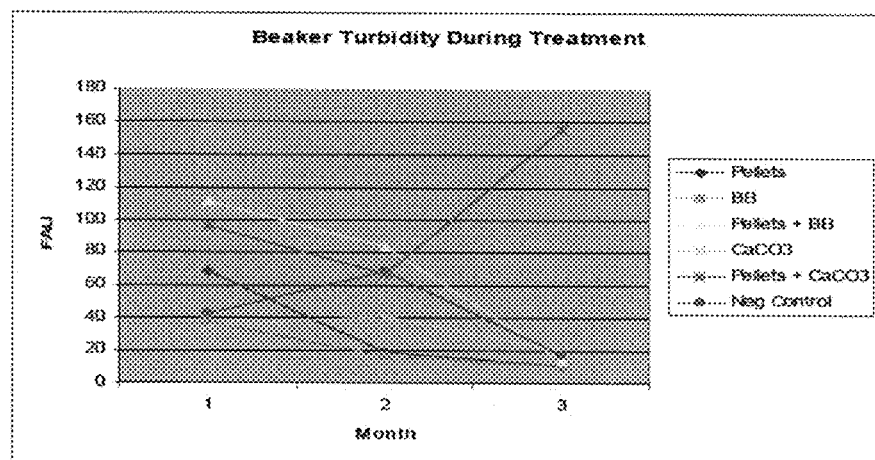
FIG. 6 is a graph of turbidity in a laboratory study

Turbidity examined throughout this study showed a continual decrease in all the test beakers. When comparing pre-treatment pictures to post, there is an increase in the presence of algae in all beakers, however, by the second month there was evidence of algal death in two beakers. Beaker 4 containing calcium carbonate and Beaker 6 (control) both appeared yellow in color indicating a dying algal system. Algal death is a common problem experienced after an initial algal bloom, as oxygen in the water is depleted; despite the presence of the air stone. As the algae died, there was a marked increase in nitrate levels. This was evident by the increase in nitrate levels above pre-treatment in this month, increasing 14% and 38% in beaker 4 and 6 respectively. By the final month, nitrate levels in Beaker 4 recovered and decreased though the system still had a dark green, yellow color. Nitrate continued to increase to 6× the contamination level in Beaker 6. FIGS. 4-6 are graphs showing the results of this laboratory study.

A field study focusing on improving general pond health and clarity while reducing sludge was also conducted on various ponds. Although this study was not aquaculture specific (as the ponds in the study were ornamental or recreational and not for raising and harvesting aquatic species) and used a biogenerator rather than an incubator and a nutrient germinant composition according to a preferred embodiment of the invention, it provides some useful information on the addition of bacteria and nitrification enhancing agents. The study included five ponds in and around Irving, Tex.; the ponds, identified as Ponds 1-5 ranged from 23,400 ft$^3$ to 720,131 ft$^3$. The length of this study was seven months. One to two times per week, a surface water sample of 200-300 mL was taken bank side from each pond. These samples were analyzed for pH, alkalinity, nitrate, phosphate, ammonia, conductivity, turbidity and $E.$ $coli$ spp. concentrations. Phosphate, ammonia and turbidity analysis was performed using a Hach DR890 colorimeter. $E.$ $coli$ spp. determination was performed using specialized media for coliform growth (3M Petrifilm 6404) incubated at 35° C. for 48 hours.

Once per month each pond was sampled for sludge depth, clarity and dissolved oxygen (DO). These measurements were taken from a small boat at two to four locations, marked by GPS coordinates to obtain representative sampling. Sludge depth was measured in inches using a sludge judge; each GPS location was sampled three to four times with the average taken. Dissolved oxygen was measured in ppm from the bottom layer and again at 18" from the surface using a Hach LDO probe with a Hach HQ30d meter. Clarity was determined in %/feet using a Secchi Disk, which gave an empirical measurement. Additionally, once per month photographs were taken at each pond at two to four locations, again marked by GPS coordinates, to give a patron point-of-view of overall surface conditions.

A BioAMP™ 750 climate controlled biogenerator was installed at each location for daily on-site dosing of a specialized pond blend of bacteria. $Bacillus$ spp. spores were pelletized using a modified FREE-FLOW™ formula; pellets were fed into the growth vessel where they grew in optimal conditions for 24 hours and were then dispersed directly into the pond. Maintenance of the BioAMP 750 had to be modified from standard protocol as sodium hypochlorite (bleach) is considered toxic to surface water and not allowed by the City of Irving for use. To obtain a similar whitening effect as the standard bleach treatment, 155 g of sodium bicarbonate (baking soda) was used to remove excess biofilm and clean the growth vessels. In addition to monthly maintenance, the biogenerators were monitored for any malfunctions and ability to maintain programmed temperature despite an ambient temperatures exceeding 100° F.

As a companion to the bacterial treatment, calcified seaweed was also applied to each pond. The amount of calcified seaweed given was dependent on volume at a ratio of 100 lbs to 1,000,000 ft$^3$ of water. The calcified seaweed was dosed using water soluble packages containing an effervescent couple and the calcified seaweed as described in U.S. patent application Ser. No. 14/689,790.

Each study pond was given the same amount of bacteria daily (30 trillion CFUs). A correlation matrix revealed that sludge depth was inversely related to dose-rate. Two of the smaller ponds had the greatest observed reduction in sludge levels and clarity, as well as, the highest daily dose of bacteria at $2 \times 10^7$ CFU/L and $7 \times 10^6$ CFU/L respectively. Clarity as observed, show positive effects on all ponds, regardless of size. Clarity was approximately 100% in the three smallest ponds of this study. Conversely the two largest ponds only achieved clarity of 20% by the end of this study.

A one-sided 2 sample t-test was used to evaluate if sludge levels significantly decreased after treatment. A p-value of 0.006 found a statistically significant average decrease of 31%. $H_0$: μ pre-treatment=p post-treatment, $H_A$: μ pre-treatment>μ post-treatment. This average reduction observed equates to an average 3 inch reduction of the sludge layer. Additionally, every pond in this study experienced a decrease in sludge level when compared to pre-treatment (see Table 3).

TABLE 3

Changes in PO$_4$, NO$_3$ & Sludge by Pond

| Pond | %Δ PO4 | %Δ NO3 | %Δ Sludge |
|---|---|---|---|
| 1 | −19 | −71 | −45 |
| 2 | −77 | −100 | −18 |
| 3 | −40 | 0 | −16 |
| 4 | −70 | −100 | −37 |
| 5 | −48 | 0 | −43 |
| Average | −52 | −91 | −31 |

The average observed change in $E.$ $coli$ spp. was a reduction of 59%. It is important to note the full range included an increase of 145% to a decrease of 100%. Such a wide range coupled with a small sample size made it difficult to determine the effectiveness of the treatment on $E.$ $coli$ spp. concentration. Three out of the five study ponds experienced an increase in $E.$ $coli$ spp. concentrations; however, the other two ponds saw a dramatic decrease; however the increase is believed to be the result of rainwater runoff into the ponds.

The overall effect of this treatment on phosphate concentrations was examined, comparing pre-treatment to post-treatment levels. The data was found to be non-parametric and a one-sided Mann-Whitney test was employed to determine if phosphate concentrations significantly decreased after treatment. $H_0$: μ pre-treatment=P post-treatment, $H_A$: μ pre-treatment>μ post-treatment. A p-value of 0.0000 was obtained indicating that the overall 52% decrease in phosphate levels after treatment was statistically significant. Detailed examinations of changes in phosphate level by pond also revealed meaningful decreases. Each treated pond saw a decrease in phosphate concentrations ranging from 19% to 77% (see Table 3). The average of 52% reduction was similar to the 57% reduction observed in phase I of this study. This indicates that the increase in frequency of bacterial dosing may not be associated with the decrease in phosphate concentrations. Furthermore, a marked decrease in phosphate levels was observed directly following an application of calcified seaweed. The first dose was administered in spring with the second given in summer after phosphate levels began to rise in June. The non-chemical, eco-friendly nature of the powdered product offers promising results for control of phosphate concentrations.

Similarly, nitrate levels were examined using a one-sided Mann-Whitney test to evaluate if nitrate concentrations significantly decreased after treatment. $H_0$: μ pre-treatment=μ post-treatment, $H_A$: μ pre-treatment>μ post-treatment. With a p-value of 0.0000 it was determined that the 91% reduction in concentration was statistically significant (see Table 3). To that end, baseline nitrate concentrations were below recommended levels so no reductions were anticipated let alone a statistically significant reduction of 91%. Furthermore, each study pond that had detectable nitrate was significantly reduced to below detection limits of 0.01 ppm by month 4. This was a vast improvement over the reduction observed in Phase I (~69%) and indicates that the increased frequency of bacterial dosing had a direct effect on these concentrations. Overall this study demonstrated that enhanced treatment with bacteria and calcified seaweed increased pond health as measured by chemical proxies and a decrease in sludge level.

Nutrient Germinant Compositions

A nutrient germinant composition according to one preferred embodiment of the invention comprises one or more L-amino acids, D-glucose (which increases the binding affinity of L-amino acids for their cognate receptors in the spore coat and is optional), D-Fructose (optional, depending on bacteria species), a biological buffer to provide the proper pH for spore germination (such as HEPES sodium salt, a phosphate buffer, or a Tris buffer), an optional source of potassium ions (such as KCl), and an industrial preservative. In another preferred embodiment, a nutrient germinant composition further comprises both D-glucose and D-fructose. It is most preferred to include a source of potassium ions, such as KCl, when both D-glucose and D-fructose are used. The use of D-fructose, a combination of D-glucose and D-fructose, and a potassium ion source are dependent on the species of bacteria as will be understood by those of ordinary skill in the art. It is preferred to use a preservative that is pH compatible with the spore composition, which has a relatively neutral pH. According to another preferred embodiment, the nutrient spore composition also comprises spores of one or more *Bacillus* species and preferably one or more germination inhibitors. A nutrient germinant composition comprising spores is referred to herein as a nutrient-spore composition, formula, or solution. Alternatively, spores may be separately added to the nutrient-germinant composition according to the invention at the point-of-use. When separately added, the spores are preferably part of a spore composition or spore formulation described herein, but other commercially available spore products may also be used. According to another preferred embodiment, the nutrient germinant or nutrient spore composition is in a concentrated form, most preferably as a concentrated liquid, and is diluted at the point-of-use.

Preferred L-amino acids include one or more of L-alanine, L-asparagine, L-valine, or L-cysteine. The L-amino acids can be provided in the form of any suitable source, such as their pure forms and/or a hydrolysate of soy protein. In a further embodiment of the concentrate nutrient germinant composition, L-amino acids can be provided as a hydrolysate of soy protein. When in a concentrated form, the spore composition preferably comprises a solution of one or more of the above mentioned L-amino acids in the weight range of about 8.9 to about 133.5 g/L, more preferably about 13.2 to about 111.25 g/L, and most preferably about 17.8 to about 89 g/L each; D-glucose (optional) and/or D-fructose (optional) in the weight range of about 18 to about 54 g/L each, more preferably about 27 to about 45 g/L each, and most preferably about 30 to about 40 g/L each; KCl (optional, as a source of potassium ions) in the weight range of about 7.4 to about 22.2 g/L, more preferably about 11.1 to about 18.5 g/L, and most preferably about 14 to about 16 g/L; a biological buffer, such as monosodium phosphate in a weight range of about 10 to about 36 g/L, more preferably about 15 to about 30 g/L, and most preferably about 20 to about 24 g/L and/or disodium phosphate in a weight range of about 30 to about 90 g/L, more preferably about 21.3 to about 75 g/L, and most preferably about 28.4 to about 60 g/L. One or more biological buffers aid in maintaining the nutrient germinant composition at the proper pH for spore germination, around pH 6-8. In addition to or in place of the monosodium/disodium phosphate buffer, the spore composition may comprise other phosphate buffer(s), Tris base in a weight range of about 15 to about 61 g/L, more preferably about 24 to about 43 g/L, and most preferably about 27 to about 33 g/L; or HEPES buffer in a weight range of about 32.5 to about 97.5 g/L, more preferably about 48.75 to about 81.25 g/L, and most preferably about 60 to about 70 g/L. Optionally, monopotassium phosphate may also be used as a source of potassium ions, preferably in a weight range of about 13.6 to about 40.8 g/L, more preferably about 20.4 to about 34 g/L, and most preferably about 26 to about 29 g/L. Optionally, dipotassium phosphate may also be used as a source of potassium ions, preferably in a weight range of about 8.7 to about 26.1 g/L, more preferably about 13 to about 21.75 g/L, and most preferably about 16 to about 19 g/L. According to another preferred embodiment, the amounts of KCl, monosodium phosphate, and/or disodium phosphate can be adjusted such that the pH in the nutrient germinant solution and/or nutrient-spore solution can be about 6, about 7, or about 8.

In another preferred embodiment, the nutrient germinant composition further comprises one or more industrial preservatives at a final (total) weight range of 0.8-3.3 g/L, more preferably 1.2-2.7 g/L, most preferably 1.6-2.2. The preservative(s) can be beneficial for long-term storage. Suitable preservatives include, NaCl, D-alanine, potassium sorbate, and chemical preservatives. Chemical preservatives can be preservatives with active ingredients of methyl chloro isothiazolinone (about 1.15% to about 1.18% v/v) and methyl isothiazolinone (about 0.35-0.4% v/v); preservatives with the active ingredients of diazolidinyl urea (about 30%), methylparaben (about 11%), and propylparaben (about 3%); and preservatives with only the active ingredient of methylparaben; and other preservatives with the methyl paraben, propylparaben, and diazolidinyl urea). Non-limiting examples of chemical preservatives with methyl chloro isothiazolinone and methyl isothiazolinone as active ingredients are Linguard ICP and KATHON™ CG (which has active ingredients comprising methyl chloro isothiazolinone, around 1.15-1.18% and methyl isothiazolinone, around 0.35-0.4%). A non-limiting example of a chemical preservative with diazolidinyl urea, polyparaben, and methylparaben as active ingredients includes Germaben II. Where the active ingredients of the chemical preservative are methyl chloro isothiazolinone and methyl isothiazolinone, the chemical preservative can be included in a concentrated nutrient solution at about 0.8 to about 3.3 g/L, more preferably from about 1.2 to about 2.7 g/L, and most preferably from about 1.6 to about 2.2 g/L. Where the active ingredient(s) of the chemical preservative is diazolidinyl urea, methylparaben, and/or propylparaben, the chemical preservative can be included in a concentrated nutrient solution at about 0.3 to about 1% (wt/wt). In some aspects, the amount of a chemical preservative having diazolidinyl urea, methylparaben, and propylparaben can be included in the nutrient formulation at about 10 g/L. In the case of methylparaben, the preservative can be included in a concentrated nutrient solution at about 0.27 to about 1.89 g/L, more preferably from about 0.81 to about 1.35 g/L, and most preferably from about 1.0 to about 1.18 g/L. According to another preferred embodiment, where the nutrient formulation can be used to generate a nutrient-spore formulation effective for aquaculture applications involving shrimp, or other shellfish, the preservative can include an amount of methylparaben and potassium sorbate. According to another preferred embodiment, a nutrient germinant solution can be used to generate a nutrient-spore formulation effect for plants and/or waste water, the nutrient-spore formulation can include an amount of Linguard ICP or KATHON™ CG.

According to yet another preferred embodiment, a nutrient germinant composition may further optionally comprise an osmoprotectant compound. Ectoine, a natural osmoprotectant produced by some species of bacteria, may be included in one preferred embodiment. The amount of ectoine (optional) in a concentrated nutrient germinant composition can range from about 0.625 to about 4.375 g/L, more preferably from about 1.875-3.125 g/L, and most preferably in an amount around 2-3 g/L. According to another preferred embodiment, a nutrient germinant composition may further comprise other standard ingredients including, but not limited to, surfactants that aid in the dispersal of active ingredients, additional preservatives ensure the shelf-life of the spore composition, buffers, diluents, and/or other ingredients that are typically included in a nutrient formulation and/or spore formulation.

The amounts of the above ingredients are important aspects of the invention because higher concentrations would render some ingredients insoluble and lower concentrations would be ineffective at germinating spores.

According to another preferred embodiment, a nutrient-germinant concentrate composition according to embodiments of the invention is in concentrated form and is diluted to a working solution in water, a spore composition, or any other appropriate diluent, or a combination thereof prior to germination at a point-of-use as described further below. According to various preferred embodiments, a working nutrient germinant solution may be made by diluting a concentrated nutrient germinant composition according to a preferred embodiment herein with water or other suitable diluent in a ratio between 0.01% to 50% (v/v) concentrated nutrient germinant composition to diluent, but other amounts may also be used. The concentrated nutrient germinant compositions according to the invention may diluted anywhere from 2 to $1\times10^6$ fold or any range or value therein to produce a working nutrient germinant solution. Most preferably, dilution is in a range from about 0.1 to about 10% of the concentrate and the balance water or other suitable diluent. The amounts of the above described ingredients present in a working nutrient solution (a diluted solution from a concentrated formula) may be calculated based on the dilution factor and the concentrated amounts described above.

The use of a concentrated nutrient germinant composition reduces shipping, storage, and packaging costs and makes dosing of the spore composition at the point-of-use easier. Most preferably, the concentrated nutrient germinant composition is in a liquid form, which is easier and faster to mix with diluent at the point-of-use, but solid forms such as pellets or bricks or powder may also be used. The inclusion of a general, industrial preservative in the nutrient germinant composition aids in long-term storage.

Most preferably, all ingredients in nutrient germinant compositions according to the invention or used with methods of the invention meet U.S. federal GRAS standards.

Nutrient Spore Compositions

According to another preferred embodiment, the composition is a nutrient-spore composition comprising ingredients described above for a nutrient germinant composition and spores pre-mixed together. According to one preferred embodiment, a nutrient spore composition preferably comprises 10% to 90% by weight of one or more *Bacillus* spores or a spore blend (comprising 40-60% spore powder with one or more *Bacillus* species and 60-40% salt). According to another preferred embodiment, a nutrient spore composition comprises around 5% by weight of one or more *Bacillus* spores or a spore blend. The total concentration of spores in the nutrient spore composition can range from about $1\times10^5$ CFU/mL or spores/g to $1\times10^{14}$ CFU/mL or spores/g or any specific concentration or range therein.

A nutrient-spore composition preferably also comprises one or more germination inhibitors and/or preservatives. Preferred germination inhibitors or preservatives for a concentrated nutrient spore composition include NaCl at a relatively high concentration ranging from about 29 to about 117 g/L, more preferably from about 43 to about 88 g/L, and most preferably from about 52 to about 71 g/L; and/or D-alanine in an amount ranging from about 8 to about 116 g/L, more preferably from about 26 to about 89 g/L, and most preferably from about 40 to about 50 g/L; and/or potassium sorbate in an amount ranging from about 1.25 to about 8.75 g/L, more preferably from about 3.75 to about 6.25 g/L, and most preferably from about 4.5 to about 5.5 g. Other chemical preservatives described above with preferred nutrient germinant composition may also be used with nutrient spore compositions according to the invention. These germination inhibitors or preservatives maintain the spores in an inactive state and prevent premature germination of the spores prior to their dilution and activation at the point-of-use. The use of germination inhibitors is particularly preferred when the spore composition according to this embodiment is used with the preferred method of the invention, where germination occurs at the point-of-use. When spores are included, the amounts of other ingredients for the nutrient germinant composition described above (such as L-amino acids, biological buffers, etc.) make up the balance of the spore composition reduced proportionally to correspond to the preferred ranges described above. Preferred nutrient spore compositions are also in concentrated form and diluted to a working solution at a point-of-use as described above with respect to nutrient germinant composition and further described below.

The preferred *Bacillus* spores for use in a nutrient spore composition according to preferred embodiments of the invention include the following species: *Bacillus licheniformis, Bacillus subtilis, Bacillus amyloliquiefaciens, Bacillus polymyxa, Bacillus thuringiensis, Bacillus megaterium, Bacillus coagulans, Bacillus lentus, Bacillus clausii, Bacillus circulans, Bacillus firmus, Bacillus lactis, Bacillus laterosporus, Bacillus laevolacticus, Bacillus polymyxa, Bacillus pumilus, Bacillus simplex*, and *Bacillus sphaericus*. Other *Bacillus* spore species may also be used as will be understood by those of ordinary skill in the art. Preferably, a nutrient spore composition comprises 1 to 20 or more species of *Bacillus*, more preferably between 3 to 12 *Bacillus* species. According to another preferred embodiment, a nutrient spore composition comprises 3 strains of *Bacillus* bacteria, most preferably 2 strains of the *Bacillus* bacteria can each be a strain of the species *Bacillus licheniformis* and the third strain is a species of *Bacillus subtilis*. According to another preferred embodiment, the spores in a spore blend comprise about 80% *Bacillus licheniformis* (40% of each strain) and 20% *Bacillus subtilis*.

In another preferred embodiment, a nutrient-spore composition for use as a probiotic comprises one or more *Bacillus* strains that are probiotic in nature in that they aid in the breakdown of nutrients in the digestive tract of the consumer. The strains preferably produce one or more of the following enzymes: proteases to hydrolyze proteins, amylases to hydrolyze starches and other carbohydrates, lipases to hydrolyze fats, glycosidases to assist in the hydrolysis of glycosidic bonds in complex sugars and to assist in degradation of cellulose, cellulases to degrade cellulose to glucose, esterase which is a lipase-like enzyme, and xylanases that degrade xylan, a polysaccharide found in plant cell walls. *Bacillius* strains that produce these enzymes are well known in the art.

According to another preferred embodiment, a nutrient spore composition is in a concentrated form and is diluted with to a working solution in water or any other appropriate diluent, or a combination thereof, prior to germination at a point-of-use as described further below. According to various preferred embodiments, a working nutrient spore solution may be made by diluting a concentrated nutrient spore composition according to a preferred embodiment herein with water or other suitable diluent in a ratio between 0.01% to 50% (v/v) concentrated nutrient germinant composition to diluent, but other amounts may also be used. The concentrated nutrient spore compositions according to the invention may diluted anywhere from 2 to $1 \times 10^{13}$ fold or any range or value therein to produce a working nutrient germinant solution. Most preferably, dilution is in a range from about 0.1 to about 10% of the concentrate and the balance water or other suitable diluent. The amounts of the above described ingredients (such as L-amino acids and germination inhibitors) present in a working nutrient solution (a diluted solution from a concentrated formula) may be calculated based on the dilution factor and the concentrated amounts described above Most preferably, all ingredients in nutrient spore compositions according to the invention or used with methods of the invention meet U.S. federal GRAS standards.

Spore Compositions

A probiotic spore composition according to one preferred embodiment of the invention comprises one or more bacterial species, an optional surfactant, a thickener, and optionally one or more acidifiers, acids or salts or acids to act as a preservative. According to another preferred embodiment, a spore composition further comprises one or more prebiotics, to the extent the thickener is not also a prebiotic, or in addition to any thickener that is a prebiotic. According to another preferred embodiment, a spore composition further comprises one or more water activity reducers. Most preferably, the spore compositions according to the invention comprise various species of suspended probiotic spores, as described in more detail below. The use of these species in spore form increases the stability of the probiotics in the harsh environmental conditions that may be found near aquaculture application sites. The total concentration of spores in the spore composition can range from about $1 \times 10^{5}$ CFU/mL or spores/g to $1 \times 10^{14}$ CFU/mL or spores/g or any specific concentration or range therein.

A suitable thickener is included in the spore composition according to preferred embodiments. The thickener is preferably one that does not separate or degrade at varying temperatures typically found in non-climate controlled aquaculture environments. The thickener aids in stabilizing the suspension so the bacterial mixture remains homogenous and dispersed through a volume of the spore composition and does not settle out of the suspension. When used with an incubation system and aquaculture treatment methods according to preferred embodiments of the invention described herein, this ensures that the concentration of probiotic materials is evenly distributed throughout the container so that the dosage of spores delivered to an incubator remains consistent or relatively consistent (depending on the specific delivery method and control mechanism used) throughout a treatment cycle.

The most preferred thickener is xanthan gum, which is a polysaccharide composed of pentasaccharide repeat units of glucose, mannose, and glurcuronic acid and a known prebiotic. Unlike some other gums, xanthan gum is very stable under a wide range of temperatures and pH. Another preferred thickener is acacia gum, which is also a known prebiotic. Other preferred thickeners include locust bean gum, guar gum and gum arabic, which are also believed to be prebiotics. In addition to prebiotic benefits, these fibers do not bind to minerals and vitamins, and therefore, do not restrict or interfere with their absorption and may even improve absorption of certain minerals, such as calcium, by aquatic species. Other thickeners that are not considered prebiotics may also be used.

Preferred embodiments may optionally include one or more prebiotics, which are preferably used if the thickener used is not a prebiotic but may also be used in addition to a prebiotic thickener. Prebiotics are classified as disaccharides, oligosaccharides and polysaccharides, and can include Inulin, Oligofructose, Fructo-oligosaccharides (FOS), Galacto-oligosaccharide (GOS), trans-Glacto-Oligosaccharides (TOS) and Short-Chain Fructo-oligosaccharides (sc-FOS), soy Fructo-oligosaccharide (soyFOS), Gluco-oligosaccharides, Glyco-oligosaccharides, Lactitol, Malto-oligosaccharides, Xylo-oligosaccharides, Stachyose, Lactulose, Raffinose. Mannan-oligosaccharide (MOS) are prebiotics may not enrich probiotic bacterial populations, but will bind with and remove pathogens from the intestinal tract and are believed to stimulate the immune system.

Preferred embodiments also preferably include one or more acidifiers, acids, or salts of acids to act as a preservative or to acidify the spore composition. Preferred preservatives are acetic acid, citric acid, fumaric acid, propionic acid, sodium propionate, calcium propionate, formic acid, sodium formate, benzoic acid, sodium benzoate, sorbic acid, potassium sorbate, and calcium sorbate. Other known preservatives, preferably generally regarded as safe (GRAS) food preservatives, may also be used. Preferably, the pH of the spore composition is between about 4.0 and 7.0. More preferably it is between about 4.0 and 5.5 and most preferably around 4.5 to prevent premature germination of the spores prior to use or addition to an incubator as described below. Reducing the pH of the spore composition may also have antimicrobial activity with respect to yeast, molds, and pathogenic bacteria.

One or more water activity reducers, such as sodium chloride, potassium chloride, or corn syrup (a 70% solution of corn syrup), are optionally included in the spore composition according either preferred embodiment. The water activity reducer aids in inhibiting microorganism growth, so that the bacterial spores do not prematurely germinate while the spore composition is being stored prior to the time it is discharged to the point of consumption by the animals or plants to be treated or point of use in discharging to a growing pond. They also aid in inhibiting growth of contamination microorganisms The optional surfactant is preferably one that is safe for ingestion by animals, although other surfactants may be used with other applications, such as delivery to plants. Most preferably, the surfactant is Polysorbate 80. Although any GRAS or AAFCO approved surfactants or emulsifiers may be used with either embodiment, there are concerns that some animals may not tolerate all approved surfactants well. Because the benefits of the surfactant in stabilizing the suspension so the bacterial mixture remains homogenous and does not settle out may also be achieved by the use of the thickener, it is not necessary to add the surfactant. If a surfactant is used in the spore composition according to this second embodiment, it is preferably used in about the same weight percentage range as in the first embodiment.

Preferred bacteria for use with a spore composition according to the invention are the same as those described above for a preferred nutrient spore composition. Most preferably, the bacterial species used in a spore composition are one or more species from the *Bacillus* genus. The most preferred species for the probiotic bacteria include the following: *Bacillus pumilus, Bacillus licheniformis, Bacillus amylophilus, Bacillus subtilis, Bacillus amyloliquefaciens, Bacillus coagulans, Bacillus clausii, Bacillus firmus, Bacillus megaterium, Bacillus mesentericus, Bacillus subtilis* var. *natto*, or *Bacillus toyonensis*, but any *Bacillus* species approved as a probiotic in the country of use may also be used. It is preferred that the bacteria are in spore form, as the spore form is more stable to environmental fluctuations, such as ambient temperature changes. Most preferably, the spores used in the spore compositions according to the invention are a dry powder blend that comprises around 40-60% salt (table salt) and 60-40% bacterial spores. The spores are preferably spray-dried from a liquid fermentation concentrate. Salt is used to dilute the pure spray-dried spore powder to a standard spore count in the final spore powder blend. During production fermentation, different *Bacillus* strains will grow at different rates, resulting in varying final count numbers for the fermentation batch liquor. The fermentation liquor is centrifuged to concentrate the spores in the liquor. Then, the concentrated liquor is spray-dried which results in a powder containing only *Bacillus* spores. The addition of salt to the spray-dried *Bacillus* spore powder aids in standardizing the spore blend count per gram from batch to batch. Other forms of bacterial spores or spore blends may also be used. Most preferably, the dry spore blend is pre-mixed with a portion of the water used in the spore composition, around 3-30% of the total water, and the resulting bacteria spore solution is added to the other ingredients, including the remaining water. This aids in dispersing the bacteria spores throughout the spore composition.

A probiotic spore composition according to a first preferred embodiment of the invention preferably comprises bacterial spores that provide $10^8$ cfu/ml of the spore suspension (most preferably around $1.0\times10^8$ to around $3.0\times10^8$ cfu/ml of spore composition, which, when diluted in growing pond water provides approximately $10^1$ to 104 cfu/ml pond water), 0.00005 to 3.0% surfactant, and 0.002 to 5.0% thickener, and optionally the about 0.01 to 2.0% of one or more acids or salts of acids as a preservative, all percentages by weight of the spore composition. A probiotic spore composition according to another preferred embodiment of the invention comprises bacterial spores that provide $10^9$ cfu/ml of the spore suspension (which, when diluted in pond water provides approximately $10^1$ to $10^4$ cfu/ml pond water), about 0.1 to 5.0% thickener (preferably one that also acts as a prebiotic), about 0.05-0.5% of one or more preservatives, optionally about 0.1-20% of one or more water activity reducers, and optionally 0.1-20% of one or more acidifiers, all percentages by weight of the composition. The balance of the spore composition in both preferred embodiments is water and the percentages herein are by weight. It is preferred to use deionized or distilled water, to remove salts or outside bacteria, but tap water or other sources of water may also be used.

According to another preferred embodiment, a spore composition comprises around 1% to 10% of a bacteria spore blend containing salt and one or more of *Bacillus pumilus, Bacillus licheniformis, Bacillus amylophilus, Bacillus subtilis, Bacillus clausii, Bacillus coagulans, Bacillus firmus, Bacillus megaterium, Bacillus mesentericus, Bacillus subtilis* var. *natto*, or *Bacillus toyonensis* in spore form; around 0.3% to 1% total of one or more acids or salts of acids; around 0.2% to 0.5% of a thickener; around 0.1-0.3% sodium chloride, potassium chloride, or a combination thereof; around 0.00005% to 3.0% of a surfactant; and 86.2% to 98.4% water. According to another preferred embodiment, a spore composition comprises around 0.01% to 10% of the bacteria spore blend; around 0.1-0.33% sorbic acid, its salt, or a combination thereof; around 0.1-0.34% citric acid, its salt, or a combination thereof; around 0.1-0.33% benzoic acid, its salt, or a combination thereof; around 0.2-0.5% xanthan gum; around 0.00005% to 3.0% of a surfactant; and around 0.1-0.3% sodium chloride, potassium chloride, or a combination thereof, all percentages by weight of the composition. According to yet another preferred embodiment, a spore composition comprises around 5% bacteria spores or a spore blend; around 0.25% thickener; around 0.3% total of one or more acids or salts of acids; around 0.1% surfactant; around 0.2% sodium chloride, potassium chloride, or a combination thereof (in addition to any salt in the spore blend); and water. According to another preferred embodiment, the acids or salts of acids are one or more of potassium sorbate, sodium benzoate, and citric acid anhydrous.

Several examples of probiotic spore compositions according preferred embodiments of the invention were made and tested for different parameters. These spore compositions are set forth in Table 4 below.

TABLE 4

| Ingredient | \multicolumn{8}{c}{Formula No.} | | | | | | | |
|---|---|---|---|---|---|---|---|---|
| | 1 | 2 | 3 | 4 | 5 | 6 | 7 | 8 |
| Potassium Sorbate | 0.33% | 0.33% | 0.1% | 0.1% | 0.1% | 0.1% | 0.1% | 0.1% |
| Citric Acid | 0.34% | 0.34% | 0.1% | 0.1% | 5.0% | 0.1% | 0.1% | 0.1% |
| Sodium Benzoate | 0.33% | 0.33% | 0.1% | 0.1% | 0.1% | 0.1% | 0.1% | 0.1% |
| Benzoic Acid | — | — | — | 0.1% | — | 0.1% | 0.1% | — |
| Sorbic Acid | — | — | — | 0.1% | — | — | 0.1% | — |
| Sodium Propionate | — | — | — | — | 10.0% | 0.1% | — | — |
| Xanthan Gum | 0.2% | 0.2% | 0.2% | 0.3% | 0.4% | 0.4% | 0.5% | 0.5% |
| Sodium Chloride | 0.2% | 0.2% | — | 0.2% | — | 0.2% | 0.1% | 0.2% |
| Potassium Chloride | — | — | — | — | — | — | 0.1% | 0.1% |
| Spore Blend | 0.1% | 0.1% | 0.1% | 0.1% | 0.1% | 0.1% | 0.1% | 0.1% |

The balance of each spore composition is water (around 1 L in these samples). Deionized water was used in each spore composition, except spore composition No. 1, which used tap water. The percentages indicated are by weight. Each formula was targeted to have a pH between about 4.0 and 5.5, but some formulas were found to have actual pH values far less than expected. Formula No. 1 was targeted to have a pH between 5.0 and 5.5, but its actual pH was around 2.1-2.3, which is too low and may be harmful to the spores, create stability issues with packaging, and be subject to more restrictive transportation regulations. Formula No. 1 also exhibited weak thickening. Formula No. 2 is the same as No. 1, except the source of water is different. Formula No. 2 had an actual pH of around 2.2-2.3 and also exhibited weak thickening. The amount of acids and salts of acids in Formula No. 3 was decreased to raise the pH and to determine if the thickness improved while using the same amount of thickener as in Nos. 1 and 2. While Formula No. 3 was an improvement over Nos. 1 and 2, it still exhibited weak thickening and its actual pH was 6.6, over the target value range. Additional acids were added to Formula No. 4 to lower the pH and additional thickener was added. Formula No. 4 had improved thickening, but further improvements in thickening would be beneficial. The amount of acid in Formula No. 5 was substantially increased, which resulted in an actual pH of around 1.0. The amount of acid in Formula No. 6 was decreased and the thickener increased, which resulted in a spore composition that was too thick to drop. Formula No. 7 increased the thickener and amount of water activity reducers, but exhibited issues with mixing of benzoic acid and sorbic acid. The benzoic acid and sorbic acid were removed in Formula No. 8. Formula Nos. 1-7 provided $2\times10^{11}$ cfu/gm and No. 8 provided $1\times10^{11}$ cfu/gm bacteria spores. Of these sample formulas, No. 8 is the most preferred as it exhibited adequate thickening and had an actual pH of around 4.5+/−0.2, and used less spore blend.

It is preferred that the spore compositions according the embodiments of the invention use around 0.01% to around 0.3% bacteria spore blend and more preferably between about 0.03% to 0.1% bacteria spore blend. A reduction in the amount of spore blend used substantially reduces the costs of the spore composition. Depending on the end use application, differing amounts of spore blend may be used in the spore compositions according to the invention. For example, smaller percentages of spore blend may be used in the spore compositions for use with chickens, whereas larger percentages would be used in spore composition for use with pigs.

A spore composition according to formula No. 8 was tested for shelf-life at various temperatures. Samples of Formula No. 8 were sealed in a plastic bag, such as one used in a preferred delivery system as described below, and stored for two months at temperatures around 4-8° C. (39-46° F.), 30° C. (86° F.), and 35° C. (95° F.) to simulate typical temperature ranges in which the probiotic spore composition may be stored and used in agricultural settings. At the end of the first month of the storage period, each sample was observed and tested. All three samples had a pH of around 4.5 and there was no settling, layering or change of appearance in any of the three samples, indicating that the bacteria spores remained suspended and dispersed throughout the spore composition during the storage period. None of the samples contained any fungal contamination or gram-negative bacteria contamination. At time count zero (when the samples were initially stored), each sample contained bacteria spores of around $2.12\times10^{8}$ cfu/mL. At the end of the one month storage period, the samples contained bacteria spores of around $2.09\times10^{8}$ cfu/mL spore suspension (lowest temperature sample), $1.99\times10^{8}$ cfu/mL (middle temperature sample), and 2.15 $10^{8}$ cfu/mL (high temperature sample). The bacteria counts are somewhat variable in different samples, especially thickened samples; however, these are considered to be comparable counts. Each sample was tested again after two months in storage. The samples contained bacteria spores of around $2.08\times10^{8}$ cfu/ml (lowest temperature sample); $2.01\times10^{8}$ cfu/ml (middle temperature sample); and $2.0\times10^{8}$ cfu/ml (high temperature sample). The target shelf life is around $2\times10^{8}$ cfu/ml spore suspension, so the samples are within the targeted shelf life after two months of storage. These test results demonstrate that probiotic spore compositions according to a preferred embodiment of the invention are stable over a range of temperatures, with the bacteria spores remaining viable, suspended, and dispersed throughout the spore composition. The spore blend (40-60% spore powder and 60-40% salt) used in each sample formula was the same, providing at least around $2\times10^{11}$ spores/gram. The spore species in the blend were multiple *Bacillus subtilis* and *Bacillus licheniformis* strains. The spore blend powder was premixed with 100 mL of water with stirring for 30 minutes prior to adding to the other ingredients. Premixing with water aids in mixing the spore blend with the other ingredients and dispersing the spores throughout the spore composition.

Although it is preferred to use probiotic spore compositions comprising one or more *Bacillus* species as according to the spore compositions of the invention, the methods of the invention may be used with spore compositions comprising other bacteria genera and other species. For example, one or more species from the following genera: *Bacillus, Bacteroides, Bifidobacterium, Pediococcus, Enterococcus, Lactobacillus,* and *Propionibacterium* (including *Bacillus pumilus, Bacillus licheniformis, Bacillus amylophilus, Bacillus subtilis, Bacillus amyloliquefaciens, Bacillus clausii, Bacillus coagulans, Bacillus firmus, Bacillus megaterium, Bacillus mesentericus, Bacillus subtilis* var. *natto,* or *Bacillus toyonensis Bacteroides ruminocola, Bacteroides ruminocola, Bacterioides suis, Bifidobacterium adolescentis, Bifidobacterium animalis, Bifidobacterium bifidum, Bifidobacterium infantis, Bifidobacterium longum, Bifidobacterium thermophilum, Pediococcus acidilacticii, Pediococcus cerevisiae, Pediococcus pentosaceus, Enterococcus cremoris, Enterococcus diacetylactis, Enterococcus faecium, Enterococcus intermedius, Enterococcus lactis, Enterococcus thermophilus, Lactobacillus delbruekii, Lactobacillus fermentum, Lactobacillus helveticus, Lactobacillus lactis, Lactobacillus plantarum, Lactobacillus reuteri, Lactobacillus brevis, Lactobacillus buchneri, Lactobacillus bulgaricus, Lactobacillus casei, Lactobacillus farciminis, Lactobacillus cellobiosus, Lactobacillus curvatus, Propionibacterium acidipropionici, Propionibacterium freudenreichii, Propionibacterium shermanii*) and/or one or more of the following species: *Leuconostoc mesenteroides, Megasphaera elsdennii* may be used with compositions and method of the invention.

Spore compositions may also be in a concentrated form, using less water with a proportional increase in the amounts of other ingredients as described above. Such concentrated spore compositions may be diluted at the point-of-use with a nutrient germinant composition, water, other suitable diluent or a combination thereof prior to germination. Most preferably, all ingredients in spore compositions according to the invention or used with methods of the invention meet U.S. federal GRAS standards.

Methods of Germination

According to one preferred embodiment, a method of germinating spores at a point-of-use according to the invention comprises providing nutrients and spores (preferably providing a nutrient germinant composition and a spore composition or providing a nutrient spore composition according to the invention, but other commercially available products containing spores and nutrients, together or separately, may be used) and heating them to an elevated temperature or range of temperatures and maintaining them at that temperature or within that range for a period of time (incubation period) to allow germination at a point-of-use location near a point-of-consumption. Heating during the incubation period takes place in a single step with both the nutrients and spores together. The method also preferably comprises the step of dispensing the germinated spores to an aquaculture application as previously discussed. Preferably, the nutrient germinant composition and spore composition (or nutrient spore composition) is heated to a temperature in a range of 35-55° C., more preferably in the range of 38-50° C., and most preferably in the range of 41° C. to 44° C. The incubation period can vary depending on the end-use application. For a probiotic application, where the aquatic species with a digestive system (e.g. fish or eels) will ingest the bacteria, it is preferred that the incubation period lasts no longer than 10 minutes. Most preferably, in a probiotic application, the incubation period is between 2-5 minutes. In this way, spores are released to the growing pond before the spores have fully germinated and stand a better chance of surviving through to aquatic species' intestinal tract where they are most beneficial. For treating the water in an aquaculture application, such as may be done with a shrimp aquaculture application, the preferred incubation time is at least one hour to allow the spores to fully germinate before discharging to the water, more preferably 4 to 6 hours, to allow the bacteria to become vegetative before discharging to the water. Most preferably, a nutrient germinant composition and a spore composition (or a nutrient spore composition), preferably in accordance with an embodiment of the invention discussed herein, are added to an incubator to incubate the spores at the above preferred temperature ranges and durations to produce a bacteria solution having bacteria in a vegetative state. The incubation may be in an air incubator, a water incubator, or any other chamber that provides even, constant heat at the given temperature range. The bacteria solution is then discharged to an aquaculture application as previously discussed. If a concentrated nutrient germinant composition is used, diluent water is preferably added to the incubator with the nutrient germinant composition.

Various nutrient germinant compositions according to preferred embodiments of the invention were tested according to preferred methods of the invention. The compositions, methods, and results are described below.

Example 1

To germinate spores, FreeFlow LF-88 Probiotic (spore liquid formula commercially available from NCH Corporation) was added to 1 mL of tap water at a final concentration of approx. $1 \times 10^9$ CFU/mL, where CFU stands for colony forming unit. A nutrient germinant concentrate composition according to a preferred embodiment of the invention comprising L-alanine (89 g/L), monosodium phosphate (20 g/L), disodium phosphate (60 g/L), and Linguard CP (1.6 g/L total) was added to the water and bacteria mixture to provide a 4% final concentration of nutrient-germinant composition by total weight of the mixture. For comparison, negative control reactions were prepared with the same amount of FreeFlow LF-88 Probiotic and water, but without adding the nutrient germinant concentrate composition. Both mixtures (germinant and negative control without the nutrient-germinant composition) were blended and incubated for 60 minutes in a pre-incubated heat block set to 42° C. or at ambient room temperature (around 23° C.).

Spores from each reaction were observed using phase contrast microscopy. Slides were prepared using standard procedures. Spores were viewed on an Olympus BX41 microscope (100× oil emersion objective) and imaged using an Olympus UC30 camera controlled by the cellSens Dimension software package.

Images were taken and germinated spores were counted as a percentage of the total spores in the field. A total of 10 representative images were analyzed for each condition (test mixture). Germinated spores lose their refractivity due to the influx of water and are phase-dark while non-germinated spores are phase-bright.

Figure 7:
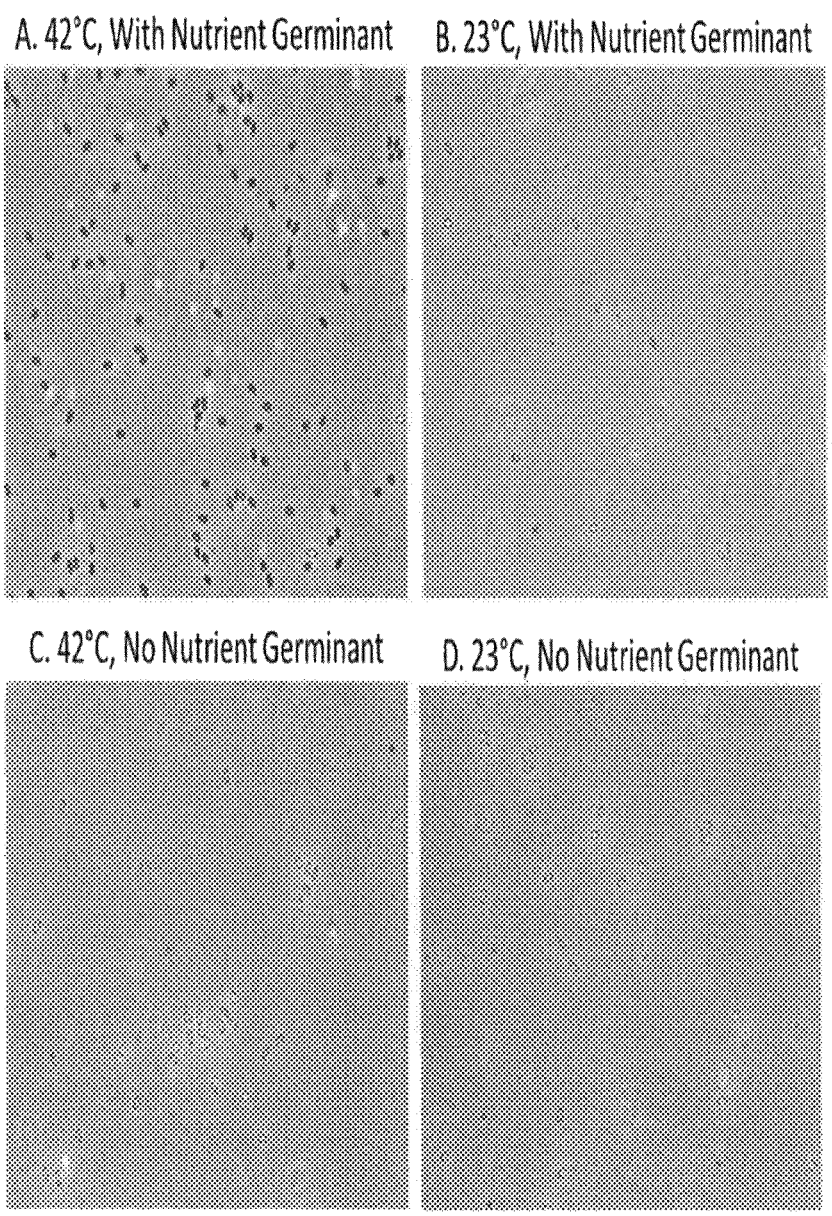
FIG. 7 shows photographs of bacteria slides using a spore composition and method according to a preferred embodiment of the invention compared to control slides.

FIG. 7 shows representative images from these tests. Image A represents spores that had been germinated using a nutrient-germinant composition and heated during the incubation period at 42° C. according to a preferred spore composition and preferred method of the invention. The darker spots show germinated spores, the lighter spots show non-germinated spores. Image B represents spores that had been germinated using a nutrient-germinant composition according to a preferred embodiment of the invention, but were incubated at ambient temperature (23° C.). Images C-D represent control spores that had not been treated with a nutrient germinant composition according to the invention, one having been incubated at 42° C. and one incubated at ambient temperature (23° C.).

As can be seen in FIG. 7, the "A" image shows significantly more germinated spores (dark spots) than the other images. Spores incubated with a nutrient-germinant composition according to a preferred embodiment invention in combination with a germination method according to a preferred embodiment of the invention show an apparent germination efficiency of 96.8% (Example 1, FIG. 7A). Control spores that had been incubated with a nutrient-germinant composition according to a preferred embodiment of the invention, but without using a germination method according to a preferred embodiment of the invention showed an apparent germination efficiency of 2.3% (Example 1, FIG. 7B). Similarly, spores that had not been incubated with a nutrient-germinant composition according to the invention showed an apparent activation efficiency of 1.2% and 2.6% at 42° C. and 23° C., respectively (Example 1, FIGS. 7C and 7D). Germinated spores in the samples not treated by preferred embodiments of the present method represent the small percentage of spores already germinated in the FreeFlow LF-88 Probiotic solution. This example demonstrates that spore germination is significantly increased when a nutrient-germinant composition and incubation method according to preferred embodiments of the invention are used together.

Example 2

Another set of incubation tests were run using the same test mixture/incubation method (using the same nutrient-germinant composition and heated incubation, "Treated Spores, 42° C.") and control mixture/incubation method (no nutrient-germinant composition and no heat, "Non-treated Spores, 23° C.") as described above in Example 1 were repeated, but different tests were run to compare the efficacy of the test mixture according to preferred embodiments of the invention as compared to the control mixture. Additionally, two other mixtures were tested—one in which the nutrient-germinant composition of Example 1 was used but without heat ("Treated Spores, 23° C.") and one in which no nutrient-germinant was used but the spores were heated ("Non-Treated Spores, 42° C."). Briefly, spores were incubated at 42° C. or 23° C. for 1 hour with or without treatment with a preferred nutrient-germinant composition. After incubation, the spores from 1 mL of each reaction were pelleted at 14K RPM for 3 min at 23° C. and resuspended in 1 mL of Butterfield's buffer. Approx. $6 \times 10^5$ CFUs (0.02 mL) were added to 0.980 mL of Davis minimal media (containing 3% glucose as a carbon source and trace elements) with an excess of D-alanine. D-alanine is a potent inhibitor of L-amino acid-mediated germination.

Approx. $1.2 \times 10^5$ CFUs were added to each of four wells of a PreSens OxoPlate. PreSens OxoPlates use optical oxygen sensors to fluorescently measure the oxygen content of the sample using two filter pairs (excitation: 540 nm, emission: 650 nm and excitation: 540, emission: 590 nm). Controls were performed as described by the manufacturer and measurements were taken on a BioTek 800FLx fluorescence plate reader. Time points were taken every 10 minutes for 24 hours at 37° C. with continual shaking and data was processed to determine the partial pressure of oxygen ($pO_2$) using the following formula:

$$pO_2 = 100 * [(K_0/IR) - 1(K_0/K_{100}) - 1]$$

Spores that have germinated and continue to divide and grow as vegetative cells consume oxygen as part of their metabolic growth. Oxygen consumption is represented by a drop in $pO_2$. Presumably, the growth that is observed is due to the outgrowth and vegetative growth of spores germinated by the present invention. The $pO_2$ levels for these tests are shown in FIG. 8.

Figure 8:
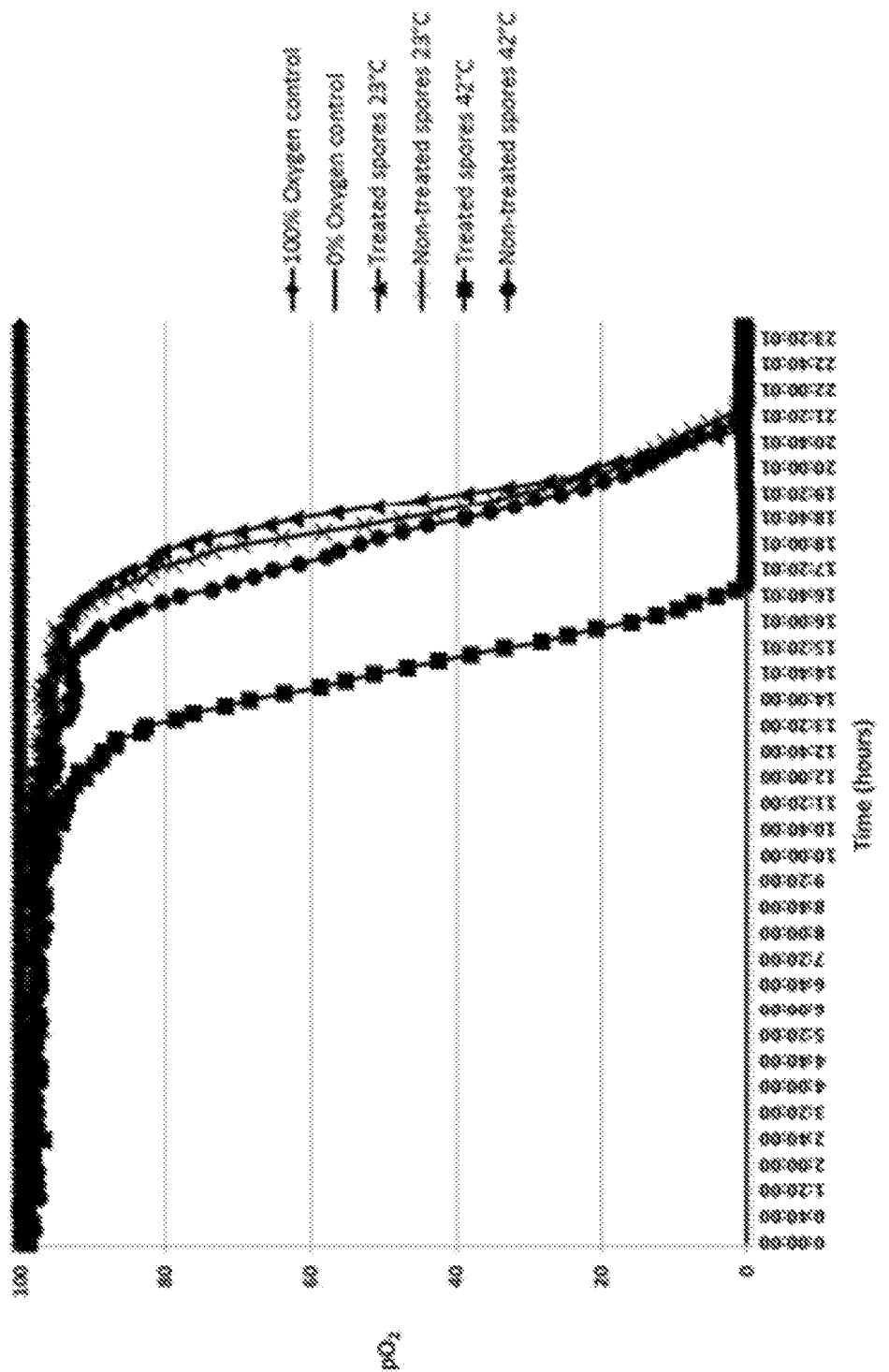
FIG. 8 is a graph showing $pO_2$ test data to demonstrate germination levels using a spore composition and method according to a preferred embodiment of the invention compared to control tests.

As shown in FIG. 8, incubation with the test mixture and method according to preferred embodiments of the invention (Treated spores 42° C., using both the nutrient-germinant composition and heating) resulted in spores that began vegetative growth 4 hours faster than the control spore mixtures that had not been treated or heated according to preferred embodiments of the invention or had been either treated with a nutrient-germinant composition or heated, but not both together. The growth seen in the control experiments presumably represents the approx. 2% of germinated spores present in FreeFlow LF-88 Probiotic (see EXAMPLE 1). This example further indicates that spore germination is significantly increased when a nutrient-germinant composition and incubation method according to preferred embodiments of the invention are used.

Example 3

Another set of incubation tests were run using a similar test and control mixture and incubation method as described above in Example 1. Briefly, LF-88 was added to 10 mLs of distilled water at a final concentration of approx. $10^8$ CFU/mL. Samples were incubated at various temperatures to show the efficacy of the test method according to preferred embodiments of the invention as compared to the control mixture. Reactions were prepared with the nutrient-germinant composition described in Example 1 ("Treated spores" in FIG. 9) and incubated at 23° C. (ambient temperature, no heating), 32° C., 42° C., or 60° C. A control reaction was incubated at ambient room temperature with no nutrient-germinant composition. After one hour of incubation, 1 mL of each reaction was pelleted at 14K RPM for 3 min at 23° C. and resuspended in Butterfield's buffer. Approx $6 \times 10^5$ CFUs (0.02 mL) were added to 0.980 mL of Davis minimal media (containing 3% glucose as a carbon source and trace elements) with an excess of D-alanine.

Approx. $1.2 \times 10^5$ CFUs were added to each of four wells of a PreSens OxoPlate. Controls were performed as described by the manufacturer and measurements were taken on a BioTek 800FLx fluorescence plate reader using two filter pairs (excitation: 540 nm, emission: 650 nm and excitation: 540, emission: 590 nm). Time points were taken every 10 minutes for 24 hours at 37° C. with continual shaking and data was processed to determine the partial pressure of oxygen ($pO_2$). The $pO_2$ levels for these tests are shown in FIG. 9.

Figure 9:
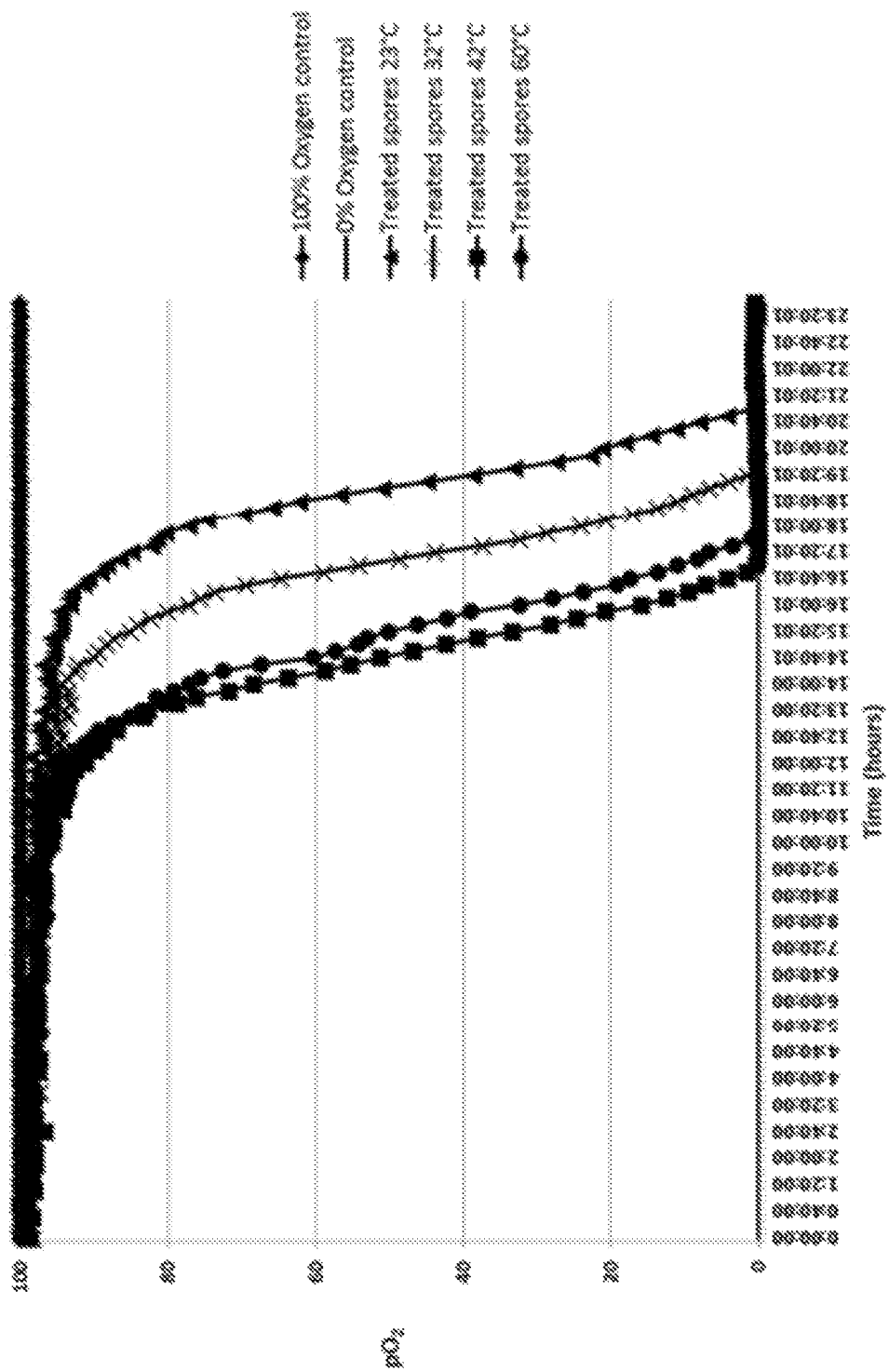
FIG. 9 is a graph showing $pO_2$ test data to demonstrate germination levels using a spore composition and varied methods according to preferred embodiments of the invention compared to control tests.

As shown in FIG. 9, incubation using a nutrient-germinant composition and heating according to preferred embodiments of the invention resulted in spores that began vegetative growth hours before the control. Spores treated with the nutrient-germinant composition but not heated are comparable to the control mixture. Spores treated with the nutrient-germinant composition that were incubated at a temperature below the preferred range of range of 35-55° C. according to one embodiment of the invention (represented by the "Treated spores 32° C." curve) begin vegetative growth faster than control experiments, but not as fast as spores treated at elevated temperatures within the preferred ranges according to the invention. Spores treated with a nutrient-germinant composition and incubated at a temperature within the most preferred range of 41° C. to 44° C. according to an embodiment of the invention showed the best results, being the first to begin vegetative growth and beginning growth 4 hours faster than the control. As seen in previous examples, growth seen in the no-treatment control experiment presumably represents the approx. 2% of germinated spores present in FreeFlow LF-88 Probiotic (see EXAMPLE 1). This example further indicates that spore germination is significantly increased when a nutrient-germinant composition and incubation method according to preferred embodiments of the invention are used.

Aquaculture Study Using Nutrient Germinant Composition and Spore Composition.

Another study was conducted to evaluate the use of preferred nutrient germinant and spore compositions with a preferred germination and aquaculture treatment method according to the invention. Three aquariums were used for this study as representative aquaculture applications. Each held 55 gallons of water and 25 Malaysian prawns to mimic stocking densities of commercial shrimp farms. Each aquarium contained the same type of netting and substrate composed of PVC pipe provided for shrimp habitation and resting. All aquariums were lined with Caribbean live sand to discourage algal growth, reduce nitrates, help buffer the aquarium system, and ensure safer aquarium cycling. Aeration stones were used in all three aquariums to improve biological filtration and increase dissolved oxygen content for shrimp and beneficial bacteria. All three aquariums used the same type of filter and filters were rinsed off, as needed, and reused. All three aquariums were refilled with deionized (DI) water as needed. DI water was used to control mineral content of the water.

When large amounts of water needed to be removed from an aquarium, the same amount of water was removed from all aquariums and replaced with the same amount of DI water. Calcium carbonate was used in aquariums 2 and 3 for water replacements to mimic the use of a Pond Powder, such as ECOCharger™ Pond Powder available from NCH Life Science. When water was replaced in aquariums 2 or 3, about 0.5 g of calcium carbonate was added to tank water. About 1 mL of an incubated or activated bacteria solution was applied once daily Monday-Friday to aquarium 3. Aquarium 1 was the control aquarium. Briefly, 20 μL of a starting spore solution (containing about $10^{10}$ CFU/mL) was mixed with 20 μL of a starting concentrated nutrient solution and 960 μL of water to form a working solution that contained about $2\times10^8$ CFU/mL spores (Table 6). The starting spore solution contained about $10^{10}$ CFU/mL spores from a spore blend. The spore blend contained 3 strains of *Bacillus* bacteria: 2 strains were each a strain of the species *Bacillus licheniformis* and the third strain was a species of *Bacillus subtilis*. About 80% of the spore blend formulation was *Bacillus licheniformis* (40% of each strain) spores and 20% of the spores in the spore blend formulation were *Bacillus subtilis*. The spore composition also included water, thickener, and organic salts, according to a preferred embodiment described above.

The combined working solution (containing nutrient germinant composition, spore composition, and water) was incubated at about 42° C. for about 1 hour to produce an activated bacteria solution. Following this incubation, the entire activated bacteria solution (about 1 mL) was added to aquarium 3. Mixing was accomplished via aeration by mixing stone. Table 5 shows the composition of the starting nutrient germinant formulation. Table 6 shows the composition of the working solution that was incubated. After mixing the incubated bacteria solution into 55 gallons of aquarium 3, the concentration of the bacteria was about $9.6\times10^2$ CFU/mL and the final percent of the nutrient germinant composition in aquarium 3 was about $9.6\times10^{-6}$% v/v. The contents of each aquarium after their respective treatments have been applied are shown in Table 7. The trial continued for 120 days.

TABLE 5

Components of a Nutrient Formulation.

| Component | Wt % in Starting Nutrient Formulation | g/L in Starting Nutrient Formulation | g/L in Working Nutrient-Spore formulation | g/L in Final Dilution |
| --- | --- | --- | --- | --- |
| Water | 82.9 | 829 | 996.58 | 999.97 |
| L-alanine | 8.9 | 89 | 1.78 | $8.5 \times 10^{-5}$ |
| Disodium Phosphate | 6 | 60 | 1.2 | $5.76 \times 10^{-6}$ |
| Monosodium phosphate | 2 | 20 | 0.4 | $1.93 \times 10^{-6}$ |
| Germaben II | 0.2 | 2 | 0.04 | $1.92 \times 10^{-7}$ |

TABLE 6

Working Nutrient-Spore Formulation.

| Component | Starting Volume | Starting Concentration | Final Concentration |
| --- | --- | --- | --- |
| Starting Nutrient Formulation | 20 μL | 100% (v/v) | 2% (v/v) |
| Starting Spore Formulation | 20 μL | 100% (v/v) about $10^{10}$ CFU/ML | About $2 \times 10^{-8}$ CFU/mL |
| Water | 960 μL | 100% (v/v) | 96% (v/v) |
| Final Volume | 1000 μL | NA | NA |

TABLE 7

Aquarium Contents (Treatment Groups)

| Aquarium 1 (Control Treatment Group) | Aquarium 2 (Pond Powder Only Treatment Group) | Aquarium 3 (Nutrient-Spore Formulation and Pond Powder Treatment Group) |
| --- | --- | --- |
| No additions | 0.5 g of Calcium Carbonate added per every water replacement | 1 mL of activated bacteria solution (incubated Working-Nutrient Spore Formulation) and 0.5 g of Calcium Carbonate added per every water replacement |

Table 8 shows the final weight and body measurements of the averaged trial groups as well as standard deviations. The control group in aquarium 1 had the smallest shrimp weight and body measurements compared to treatment groups in aquariums 2 and 3. Aquarium 3 had the largest shrimp and had the best results in terms of shrimp size compared to the prawns in aquariums 2 and 1. The average final weight of shrimp in aquarium 3 was 6.48 g. The average final weight of the prawns in aquarium 2 was 4.87 g on average. The average final weight of the prawns in aquarium 1 (the control) was 3.43 g. The average total length for prawns in aquarium 3 was also the greatest at 7.98 cm. The average total length for prawns in aquarium 2 was 7.41. The average total length for prawns in aquarium 1 (the control group) was 6.95. The average tail length of prawns in aquarium 3 was 4.67 cm. The average tail length of prawns in aquarium 2 was 4.26 cm. The average tail length of prawns in aquarium 1 (control) was the smallest at 3.87 cm.

TABLE 8

Effect of Treatment on Growth Performance.

|  | Control | Calcium Carbonate | Spores + Calcium Carbonate |
|---|---|---|---|
| Average final weight (g) | 3.43 | 4.87 | 6.48 |
| Average total length (cm) | 6.95 | 7.41 | 7.98 |
| Average Tail length (cm) | 3.87 | 4.26 | 4.67 |
| Standard Deviation Average Final Weight | 0.77 | 4.11 | 4.76 |
| Standard Deviation Average Total length | 0.42 | 1.49 | 1.30 |
| Standard Deviation Average Tail length | 0.27 | 0.68 | 0.81 |

Figure 10:
FIG. 10 shows an image of three aquariums, each under control (left), calcium carbonate only treatment (middle), or treatment with an activated nutrient-spore formulation (right).

FIG. 10 shows an image of the three aquariums that can demonstrate the water clarity in each group by the end of the 120 day trial. In terms of water clarity, aquarium 3 was observed to be clearest. Aquarium 1, the control, was observed to have the greatest amount of algal growth covering the aquarium walls as compared to aquariums 2 and 3. Aquarium 2 was observed to have only moderate algal growth on the aquarium walls as compared to the control and aquarium 3.

During the 120-day trial, all three aquariums started off with little to no algae on the sides of the aquariums. As the trial progressed, the control aquarium (aquarium 1) accumulated more algal growth on the sides of the aquarium (see e.g. FIG. 10). Aquarium 2 had less algal growth than aquarium 1. Aquarium 3 had little to no algal growth as compared to aquariums 1 and 2.

Water parameters were consistent throughout the trial. Ammonia levels were zero for all three aquariums. Nitrite/nitrate were also within safe ranges for the duration of the trial. pH also stayed within normal ranges of about 7.5 to 8.5 for all of the aquariums. There were no water parameter spikes observed that could have harmed the prawns as aquarium cycling occurred safely and parameters remained consistent for the full length of the 120-day trial.

Those of ordinary skill in the art will also appreciate upon reading this specification and the description of preferred embodiments herein that modifications and alterations to the methods and nutrient germinant and spore compositions may be made within the scope of the invention and it is intended that the scope of the invention disclosed herein be limited only by the broadest interpretation of the appended claims to which the inventors are legally entitled.

What is claimed is:

1. A method of adding bacteria to water used in an aquaculture application, the method comprising:
   providing a volume of nutrient germinant composition and a volume of bacteria spores, which may be premixed together as a nutrient spore composition or separate;
   optionally mixing a portion of the nutrient germinant composition and a portion of the bacteria spores if separate to form the nutrient spore composition;
   heating a portion of the nutrient spore composition to a temperature in a range of around 38° C. to 60° C. at or near a site of the aquaculture application;
   maintaining the temperature in the range for an incubation period of around 2 minutes to around 6 hours to form a batch of germinated bacteria solution;
   periodically repeating the heating and maintaining steps to form additional batches of germinated bacteria solution over the course of a treatment cycle;
   dispersing each batch of germinated bacteria solution into the water used in the aquaculture application;
   providing a nitrification enhancement agent;
   dispersing the nitrification enhancement agent in the water contemporaneously with at least one of the batches of germinated bacteria solution; and
   wherein the bacteria are useful for remediating the water by degrading organic waste and inhibiting the growth of pathogenic bacteria or the bacteria are probiotic for a species in the aquaculture application.

2. The method of claim 1 wherein the bacteria is selected from the group consisting of the genera *Bacillus, Bacteroides, Bifidobacterium, Lueconostoc, Pediococcus, Enterococcus, Lactobacillus, Megasphaera, Pseudomonas* and *Propionibacterium*.

3. The method of claim 2 wherein the bacteria are one or more species of *Bacillus licheniformis* and *Bacillus subtilis*.

4. The method of claim 2 wherein the probiotic bacteria is selected from the group consisting of *Bacillus amylophilus, Bacillus licheniformis, Bacillus pumilus, Bacillus subtilis, Bacteroides ruminocola, Bacteroides ruminocola, Bacterioides suis, Bifidobacterium adolescentis, Bifidobacterium animalis, Bifidobacterium bifidum, Bifidobacterium infantis, Bifidobacterium longum, Bifidobacterium thermophilum, Enterococcus cremoris, Enterococcus diacetylactis, Enterococcus faecium, Enterococcus intermedius, Enterococcus lactis, Enterococcus thermophiles, Lactobacillus brevis, Lactobacillus buchneri, Lactobacillus bulgaricus, Lactobacillus casei, Lactobacillus cellobiosus, Lactobacillus curvatus, Lactobacillus delbruekii, Lactobacillus farciminis, Lactobacillus fermentum, Lactobacillus helveticus, Lactobacillus lactis, Lactobacillus plantarum, Lactobacillus reuteri, Leuconostoc mesenteroides, Megasphaera elsdennii, Pediococcus acidilacticii, Pediococcus cerevisiae, Pediococcus pentosaceus, Propionibacterium acidipropionici, Propionibacterium freudenreichii,* and *Propionibacterium shermanii*.

5. The method of claim 1 wherein the nutrient germinant composition comprises:
   an L-amino acid;
   one or more buffers comprising a phosphate buffer, HEPES, Tris base, or a combination thereof;
   an industrial preservative;
   optionally D-glucose, or optionally D-fructose, or optionally both D-glucose and D-fructose; and
   optionally a source of potassium ions.

6. The method of claim 5 wherein the L-amino acid is L-alanine, L-asparagine, L-valine, L-cysteine, a hydrolysate of soy protein, or a combination thereof.

7. The method of claim 5 wherein the nutrient germinant composition comprises around 17.8 g/L to 89 g/L total of one or more L-amino acids.

8. The method of claim 5 wherein the nutrient germinant composition and spores are premixed and the nutrient spore composition further comprises spores of a *Bacillus* species and a germination inhibitor.

9. The method of claim 8 wherein the germination inhibitor or preservative comprises sodium chloride, D-alanine, or a combination thereof.

10. The method of claim 9 wherein the premixed nutrient spore composition comprises around 29 g/L to 117 g/L sodium chloride.

11. The method of claim 9 wherein the premixed nutrient spore composition comprises around 8 g/L to 116 g/L D-alanine.

12. The method of claim 7 wherein the phosphate buffer comprises around 10-36 g/L of monosodium phosphate and around 30-90 g/L of disodium phosphate.

13. The method of claim 1 wherein the nutrient germinant composition, or nutrient spore composition if premixed, is a concentrated liquid comprising:
around 8.9-133.5 g/L of one or more L-amino acids;
around 0.8-3.3 g/L total of one or more industrial preservatives;
around 40-126 g/L total of one or more phosphate buffers, around 15-61 g/L Tris base, or around 32.5-97.5 g/L HEPES, or a combination thereof;
optionally around 18-54 g/L of D-glucose, D-fructose, or a combination thereof; and
optionally around 7.4-22.2 g/L of KCl.

14. The method of claim 13 further comprising:
adding a diluent to the nutrient germinant composition, or nutrient spore composition if premixed, prior to or during heating; and
mixing the diluted nutrient-germinant composition and bacteria spores, or diluted nutrient spore composition, during the incubation period.

15. The method of claim 14 wherein the concentration of the diluted nutrient-germinant composition is around 0.1% to 10%.

16. The method of claim 1 wherein the nitrification enhancement agent increases the alkalinity of the water, provides increased surface area for biofilms of nitrifying bacteria to grow, or both.

17. The method of claim 1 wherein the nitrification enhancement agent is calcium carbonate, calcified seaweed, or both.

18. The method of claim 17, wherein the nitrification enhancement agent is provided in the form of prills, pellets or particles.

19. The method of claim 16 further comprising providing and dispersing an additional surface area modifier in the water contemporaneously with at least one batch of the germinated bacteria solution.

20. The method of claim 19 wherein the surface area modifier is selected from the group consisting of particles or fragments of plastic or metal.

21. The method of claim 1 wherein the nitrification enhancement agent comprises an alkalinity enhancing agent and wherein the alkalinity enhancing agent is dispersed in the water contemporaneously with one batch of germinated bacteria solution on a seasonal basis.

22. The method of claim 1 wherein the bacteria spores are in a separate spore composition comprising:
one or more *Bacillus* species in spore form;
about 0.002 to 5.0% by weight thickener;
about 0.01 to 2.0% by weight total of one or more acids or salts of acids; and
wherein the percentages are by weight of the spore composition.

23. The method of claim 5 wherein the bacteria spores are in a separate spore composition comprising:
one or more *Bacillus* species in spore form;
one or more acids or salts of acids; and
a thickener.

24. The method of claim 23 wherein the spore *Bacillus* species are one or more of: *Bacillus pumilus, Bacillus licheniformis, Bacillus amylophilus, Bacillus subtilis, Bacillus amyloliquefaciens, Bacillus clausii, Bacillus firmus, Bacillus megaterium, Bacillus mesentericus, Bacillus subtilis* var. *natto,* or *Bacillus* toyonensis.

25. The method of claim 23 wherein the spore composition has a pH of around 4.5 to around 5.5.

26. The method of claim 23 wherein the acids or salts of acids are one or more of acetic acid, citric acid, fumaric acid, propionic acid, sodium propionate, calcium propionate, formic acid, sodium formate, benzoic acid, sodium benzoate, sorbic acid, potassium sorbate, or calcium sorbate.

27. The method of claim 23 wherein the spore composition comprises:
about 0.002 to 5.0% by weight thickener;
about 0.01 to 1% by weight total of one or more acids or salts of acids; and
about 0.00005 to 3.0% by weight of a surfactant;
wherein the percentages are by weight of the spore composition.

28. The method of claim 4 wherein the incubation period is around 2 minutes to around 5 minutes.

29. The method of claim 28 wherein the aquaculture application is a growing pond containing fish or eel.

30. The method of claim 1 wherein the incubation period is around 4 to 6 hours.

31. The method of claim 30 wherein the aquaculture application is a growing pond containing shrimp.

32. The method of claim 1 wherein the temperature is in a range of around 38° C. to 50° C.

33. The method of claim 1 wherein the temperature is in a range of around 41° C. to 44° C.

34. The method of claim 5 wherein the temperature is in a range of around 38° C. to 50° C.

35. The method of claim 5 wherein the temperature is in a range of around 41° C. to 44° C.

36. The method of claim 1 wherein the nutrient germinant composition does not include fructose or glucose.

37. The method of claim 5 wherein the nutrient germinant composition does not include fructose or glucose.

38. The method of claim 34 wherein the nutrient germinant composition does not include fructose or glucose.

39. The method of claim 35 wherein the nutrient germinant composition does not include fructose or glucose.

40. The method of claim 5 wherein the industrial preservative comprises methyl chloro isothiazolinone, methyl isothiazolinone, propylparaben, methylparaben, diazolidinyl urea, or a combination thereof.

41. The method of claim 13 wherein the one or more industrial preservatives comprise methyl chloro isothiazolinone, methyl isothiazolinone, propylparaben, methylparaben, diazolidinyl urea, or a combination thereof.

42. The method of claim 5 wherein the bacteria are one or more strains of *Bacillus licheniformis* and *Bacillus subtilis*.

43. The method of claim 34 wherein the bacteria are one or more strains of *Bacillus licheniformis* and *Bacillus subtilis*.

44. The method of claim 35 wherein the bacteria are one or more strains of *Bacillus licheniformis* and *Bacillus subtilis*.

45. The method of claim 35 wherein the bacteria comprise two strains of *Bacillus licheniformis* and one strain of *Bacillus subtilis*.

46. The method of claim 22 further comprising about 0.00005 to 3.0% by weight of a surfactant.

* * * * *

UNITED STATES PATENT AND TRADEMARK OFFICE
CERTIFICATE OF CORRECTION

PATENT NO. : 10,766,799 B2
APPLICATION NO. : 15/907682
DATED : September 8, 2020
INVENTOR(S) : Charles Greenwald et al.

It is certified that error appears in the above-identified patent and that said Letters Patent is hereby corrected as shown below:

In the Claims

Column 34, Line 4 in Claim 1, "heating and maintaining" should read -- heating and the maintaining --.

Column 34, Line 6 in Claim 1, "over the course" should read -- over a course --.

Column 34, Line 14 in Claim 1, "inhibiting the growth" should read -- inhibiting growth --.

Column 34, Line 18 in Claim 2, "consisting of the genera" should read -- consisting of genera --.

Column 34, Line 25 in Claim 4, "wherein the probiotic bacteria" should read -- wherein the bacteria --.

Column 35, Line 1 in Claim 10, "wherein the premixed nutrient" should read -- wherein the nutrient --.

Column 35, Line 2 in Claim 10, "composition comprises" should read -- composition is premixed and comprises --.

Column 35, Line 4 in Claim 11, "wherein the premixed nutrient" should read -- wherein the nutrient --.

Column 35, Line 5 in Claim 11, "composition comprises" should read -- composition is premixed and comprises --.

Column 35, Line 24 in Claim 14, "composition, or nutrient" should read -- composition to form a diluted nutrient germinant composition, or to the nutrient --.

Signed and Sealed this
Twenty-fifth Day of November, 2025

John A. Squires
*Director of the United States Patent and Trademark Office*

CERTIFICATE OF CORRECTION (continued)
U.S. Pat. No. 10,766,799 B2

Column 35, Line 25 in Claim 14, "if premixed, prior to" should read -- if premixed to form a diluted nutrient spore composition, prior to --.

Column 35, Line 27 in Claim 14, "diluted nutrient-germinant" should read -- diluted nutrient germinant --.

Column 35, Line 28 in Claim 14, "bacteria spores, or diluted nutrient" should read -- the bacteria spores, or the diluted nutrient --.

Column 35, Line 30 in Claim 15, "wherein the concentration" should read -- wherein a concentration --.

Column 35, Line 31 in Claim 15, "the diluted nutrient-germinant" should read -- the diluted nutrient germinant --.

Column 35, Line 34 in Claim 16, "increases the alkalinity" should read -- increases an alkalinity --.

Column 35, Line 41 in Claim 18, "provided in the form" should read -- provided in a form --.

Column 35, Line 45 in Claim 19, "at least one batch of the germinated" should read -- at least one of the batches of germinated --.

Column 35, Line 47 in Claim 20, "wherein the surface" should read -- wherein the additional surface --.

Column 35, Line 56 in Claim 22, "in a separate spore composition comprising" should read -- in a spore composition that is separate from the nutrient germinant composition, the spore composition comprising --.

Column 35, Line 64 in Claim 23, "in a separate spore composition comprising" should read -- in a spore composition that is separate from the nutrient germinant composition, the spore composition comprising --.

Column 36, Line 1 in Claim 24, "wherein the spore Bacillus" should read -- wherein the one or more spore Bacillus --.

Column 36, Line 2 in Claim 24, "species are one or more" should read -- species in spore form are one or more --.